(12) United States Patent
Vahdat et al.

(10) Patent No.: US 12,249,048 B2
(45) Date of Patent: Mar. 11, 2025

(54) SCORE-BASED GENERATIVE MODELING IN LATENT SPACE

(71) Applicant: NVIDIA CORPORATION, Santa Clara, CA (US)

(72) Inventors: Arash Vahdat, Mountain View, CA (US); Karsten Kreis, Vancouver (CA); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 330 days.

(21) Appl. No.: 17/681,625

(22) Filed: Feb. 25, 2022

(65) Prior Publication Data

US 2022/0398697 A1 Dec. 15, 2022

Related U.S. Application Data

(60) Provisional application No. 63/208,304, filed on Jun. 8, 2021.

(51) Int. Cl.
*G06T 5/70* (2024.01)
*G06N 3/08* (2023.01)
*G06V 10/82* (2022.01)

(52) U.S. Cl.
CPC ............ *G06T 5/70* (2024.01); *G06N 3/08* (2013.01); *G06T 2207/20084* (2013.01)

(58) Field of Classification Search
None
See application file for complete search history.

(56) References Cited

U.S. PATENT DOCUMENTS

2021/0042583 A1* 2/2021 Ghaffarzadegan ..... G06N 3/047
2021/0342647 A1* 11/2021 Gou ..................... G06V 10/764
2022/0005161 A1* 1/2022 Djelouah ............... G06N 3/045

OTHER PUBLICATIONS

Brocki, L., & Neo, C. C. (2019). Concept Saliency Maps to Visualize Relevant Features in Deep Generative Models. arXiv.Org. https://doi.org/10.48550/arxiv.1910.13140 (Year: 2019).*
Song, Y., Sohl-Dickstein, J., Kingma, D. P., Kumar, A., Ermon, S., & Poole, B. (2021). Score-Based Generative Modeling through Stochastic Differential Equations. arXiv.Org. https://doi.org/10.48550/arxiv.2011.13456 (Year: 2021).*
Denoising Diffusion Probabilistic Models. (n.d.). arXiv (Cornell University). https://doi.org/10.48550/arxiv.2006.11239 (Year: 2020).*
Ho et al., "Denoising Diffusion Probabilistic Models", arXiv:2006. 11239, 2020, 25 pages.

(Continued)

*Primary Examiner* — Amandeep Saini
*Assistant Examiner* — Caroline Tabancay Duffy
(74) *Attorney, Agent, or Firm* — Artegis Law Group, LLP

(57) ABSTRACT

One embodiment of the present invention sets forth a technique for generating data. The technique includes sampling from a first distribution associated with the score-based generative model to generate a first set of values. The technique also includes performing one or more denoising operations via the score-based generative model to convert the first set of values into a first set of latent variable values associated with a latent space. The technique further includes converting the first set of latent variable values into a generative output.

20 Claims, 8 Drawing Sheets

(56) References Cited

OTHER PUBLICATIONS

Song et al., "Score-based Generative Modeling through Stochastic Differential Equations", In International Conference on Learning Representations, arXiv:2011.13456, 2021, 36 pages.
Song et al., "Generative Modeling by Estimating Gradients of the Data Distribution", In Advances in Neural Information Processing Systems, vol. 32, 2019, 13 pages.
Song et al., "Maximum Likelihood Training of Score-based Diffusion Models", arXiv:2101.09258, NeurIPS, 2021, 24 pages.
Song et al., "Denoising Diffusion Implicit Models", In International Conference on Learning Representations, 2021, 20 pages.
Dhariwal et al., "Diffusion Models Beat Gans on Image Synthesis", arXiv:2105.05233, 2021, 44 pages.
Chen et al., "WaveGrad: Estimating Gradients for Waveform Generation", arXiv:2009.00713, 2020, 15 pages.
Kong et al., "DiffWave: A Versatile Diffusion Model for Audio Synthesis", arXiv:2009.09761, ICLR, 2020, 17 pages.
Jeong et al., "Diff-tts: A Denoising Diffusion Model for Text-to-speech", arXiv:2104.01409, 2021, 5 pages.
Mittal et al., "Symbolic Music Generation with Diffusion Models", arXiv:2103.16091, 2021, 16 pages.
Niu et al., "Permutation Invariant Graph Generation via Score-based Generative Modeling", In The 23rd International Conference on Artificial Intelligence and Statistics, AISTATS 2020, vol. 108, 2020, 10 pages.
Cai et al., "Learning Gradient Fields for Shape Generation", In Computer Vision—ECCV 2020—16th European Conference, Proceedings, Part III, vol. 12348 of Lecture Notes in Computer Science, 2020, 18 pages.
Luo et al., "Diffusion Probabilistic Models for 3d Point Cloud Generation", arXiv:2103.01458, 2021, 9 pages.
Kingma et al., "Auto-Encoding Variational Bayes", In The International Conference on Learning Representations (ICLR), arXiv:1312.6114, 2014, 14 pages.
Rezende et al., "Stochastic Backpropagation and Approximate Inference in Deep Generative Models", In International Conference on Machine Learning, arXiv:1401.4082, vol. 32, 2014, pp. 14 pages.
Dupont et al., "Augmented Neural ODEs", In Advances in Neural Information Processing Systems, NIPS, 2019, 20 pages.
Kong et al., "The Expressive Power of a Class of Normalizing Flow Models", AISTATS, arXiv:2006.00392, vol. 108, 2020, 29 pages.
Huang et al., "Augmented Normalizing Flows: Bridging the Gap between Generative Flows and Latent Variable Models", arXiv:2002.07101, 2020, 27 pages.
Chen et al., "Vflow: More Expressive Generative Flows with Variational Data Augmentation", arXiv:2002.09741, 2020, 16 pages.
Vahdat et al., "NVAE: A Deep Hierarchical Variational Autoencoder", arXiv:2007.03898, NeurIPS, 2020, 21 pages.
Child, Rewon, "Very Deep VAEs Generalize Autoregressive Models and can Outperform them on Images", In International Conference on Learning Representations, 2021, 17 pages.
Vincent, Pascal, "A Connection between Score Matching and Denoising Autoencoders", Neural Computation, vol. 23, No. 7, 2011, pp. 1661-1674.
Rezende et al., "Variational Inference with Normalizing Flows", arXiv:1505.05770, vol. 37, 2015, 10 pages.
Kingma et al., "Improved Variational Inference with Inverse Autoregressive Flow", In Advances in Neural Information Processing Systems, arXiv:1606.04934, NIPS, 2016, 16 pages.
Huang et al., "A Variational Perspective on Diffusion-based Generative Models and Score Matching", arXiv:2106.02808, NeurIPS, 2021, 23 pages.
Nichol et al., "Improved Denoising Diffusion Probabilistic Models", arXiv:2102.09672, 2021, 17 pages.
Sohl-Dickstein et al., "Deep Unsupervise Learning Using Nonequilibrium Thermodynamics", In Proceedings of the 32nd International Conference on International Conference on Machine Learning, vol. 37, arXiv:1503.03585, 2015, 18 pages.
Hyvärinen, Aapo, "Estimation of Non-Normalized Statistical Models by Score Matching", Journal of Machine Learning Research, vol. 6, 2005, pp. 695-709.
Lyu, Siwei, "Interpretation and Generalization of Score Matching", In Proceedings of the Twenty-Fifth Conference on Uncertainty in Artificial Intelligence, UAI '09, AUAI Press, Jun. 18-21, 2009, pp. 359-366.
Kingma et al., "Regularized Estimation of Image Statistics by Score Matching", In Advances in Neural Information Processing Systems, 2010, 22 pages.
Bengio et al., "Generalized Denoising Auto-Encoders as Generative Models", In Proceedings of the 26th International Conference on Neural Information Processing Systems, arXiv:1305.6663, 2013, 9 pages.
Geras et al., "Scheduled Denoising Autoencoders", In 3rd International Conference on Learning Representations, ICLR, arXiv:1406.3269, 2015, 11 pages.
Saremi et al., "Deep Energy Estimator Networks" arXiv:1805.08306, NIPS, 2018, 10 pages.
Song et al., "Sliced Score Matching: A Scalable Approach to Density and Score Estimation", In Proceedings of the Thirty-Fifth Conference on Uncertainty in Artificial Intelligence, UAI 2019, arXiv:1905.07088, 2019, 31 pages.
Li et al., "Learning Energy-Based Models in High-Dimensional Spaces with Multi-scale Denoising Score Matching", arXiv:1910.07762, 2019, 19 pages.
Pang et al., "Efficient Learning of Generative Models via Finite-Difference Score Matching," arXiv:2007.03317, NeurIPS, 2020, 25 pages.
Song et al., "Improved Techniques for Training Score-Based Generative Models", arXiv:2006.09011, NeurIPS, 2020, 31 pages.
Jolicoeur-Martineau et al., "Adversarial Score Matching and Improved Sampling for Image Generation", In International Conference on Learning Representations, arXiv:2009.05475, 2021, 29 pages.
Gao et al., "Learning Energy-Based Models by Diffusion Recovery Likelihood", In International Conference on Learning Representations, arXiv:2012.08125, 2021, 25 pages.
Luhman et al., "Knowledge Distillation in Iterative Generative Models for Improved Sampling Speed", arXiv:2101.02388, 2021, 20 pages.
Roman et al., "Noise Estimation for Generative Diffusion Models", arXiv:2104.02600, 2021, 11 pages.
Simonovsky et al., "GraphVAE: Towards Generation of Small Graphs Using Variational Autoencoders", arXiv:1802.03480, 2018, 10 pages.
Jin et al., "Junction Tree Variational Autoencoder for Molecular Graph Generation", In Proceedings of the 35th International Conference on Machine Learning, 2018, 17 pages.
Grover et al., "Graphite: Iterative Generative Modeling of Graphs", In Proceedings of the 36th International Conference on Machine Learning, arXiv:1803.10459, 2019, 13 pages.
Liao et al., "Efficient Graph Generation with Graph Recurrent Attention Networks", In Advances in Neural Information Processing Systems, arXiv:1910.00760, NeurIPS, 2019, 13 pages.
Chen et al., "Variational Lossy Autoencoder", arXiv:1611.02731, ICLR, 2017, 17 pages.
Maaløe et al., "BIVA: A Very Deep Hierarchy of Latent Variables for Generative Modeling", In Advances in Neural Information Processing Systems, arXiv:1902.02102, 2019, 25 pages.
Rolfe, Jason Tyler, "Discrete Variational Autoencoders", arXiv:1609.02200, ICLR, 2016, 33 pages.
Vahdat et al., "DVAE#: Discrete Variational Autoencoders with Relaxed Boltzmann Priors", In Neural Information Processing Systems, arXiv:1805.07445, 2018, 11 pages.
Vahdat et al., "DVAE++: Discrete Variational Autoencoders with Overlapping Transformations", In International Conference on Machine Learning (ICML), 2018, 16 pages.
Vahdat et al., "Undirected Graphical Models as Approximate Posteriors", In International Conference on Machine Learning (ICML), arXiv:1901.03440, 2020, 13 pages.
Pang et al., "Learning Latent Space Energy Based Prior Model", Advances in Neural Information Processing Systems, Curran Associates, Inc., 2020, 15 pages.

(56) References Cited

OTHER PUBLICATIONS

Engel et al., "Latent Constraints: Learning To Generate Conditionally From Unconditional Generative Model", In International Conference on Learning Representations, arXiv:1711.05772, 2018, 22 pages.
Bauer et al., "Resampled Priors For Variational Autoencoders", Proceedings of the Twenty-Second International Conference on Artificial Intelligence and Statistics, PMLR, vol. 89, 2019, arXiv:1810.11428, 25 pages.
Aneja et al., "NCP-VAE: Variational Autoencoders With Noise Contrastive Priors", ICLR, 2020, 25 pages.
Makhzani et al., "Adversarial Autoencoders", arXiv:1511.05644, 2016, 16 pages.
Takahashi et al., "Variational Autoencoder With Implicit Optimal Priors", Proceedings of the AAAI Conference on Artificial Intelligence, 2019, pp. 5066-5503.
Tomczak et al., "VAE with a VampPrior", In International Conference on Artificial Intelligence and Statistics, vol. 84, arXiv:1705.07120, 2018, 16 pages.
Dai et al., "Diagnosing And Enhancing VAE Models", In International Conference on Learning Representations, arXiv:1903.05789, 2019, 44 pages.
Oord et al., "Neural Discrete Representation Learning", arXiv:1711.00937, NIPS, 2017, 11 pages.
Razavi et al., "Generating diverse high-fidelity images with VQ-VAE-2", In Advances in Neural Information Processing Systems, arXiv:1906.00446, 2019, 15 pages.
Ghosh et al., "From Variational To Deterministic Autoencoders", In International Conference on Learning Representations, arXiv:1903.12436, 2020, 25 pages.
Esser et al., "Taming Transformers For High-Resolution Image Synthesis", arXiv:2012.09841, 2020, pp. 12873-12883.
Ansari et al., "Refining Deep Generative Models Via Discriminator Gradient Flow", In International Conference on Learning Representations, arXiv:2012.00780, 2021, 24 pages.
Che et al., "Your GAN is Secretly an Energy-Based Model and You Should Use Discriminator Driven Latent Sampling", In Advances in Neural Information Processing Systems, arXiv:2003.06060, 2020, 18 pages.
Tanaka, Akinori, "Discriminator Optimal Transport", In Advances in Neural Information Processing Systems, arXiv:1910.06832, 2019, 21 pages.
Nie et al., "Controllable And Compositional Generation With Latent-Space Energy-Based Models", In Neural Information Processing Systems (NeurIPS), 2021, 14 pages.
Wehenkel et al., "Diffusion Priors In Variational Autoencoders", In ICML Workshop on Invertible Neural Networks, Normalizing Flows, and Explicit Likelihood Models, 2021, 6 pages.
Sinha et al., "D2C: Diffusion-Decoding Models For Few-Shot Conditional Generation", arXiv:2106.06819, 2021, 31 pages.
Kingma et al. "Variational Diffusion Models", arXiv:2107.00630, Neural Information Processing Systems, 2021, 26 pages.
Kim et al., "Score Matching Model For Unbounded Data Score", arXiv:2106.05527, 2021, 20 pages.
Chen et al., "Neural Ordinary Differential Equations", Advances in Neural Information Processing Systems, 2018, 13 pages.
Burda et al., "Importance Weighted Autoencoders" arXiv:1509.00519, ICLR, 2015, 14 pages.
Heusel et al., "Gans Trained by a Two Time-scale Update Rule Converge to a Local Nash Equilibrium", In Advances in Neural Information Processing Systems, 2017, 12 pages.
Xiao et al., "VAEBM: A Symbiosis between Variational Autoencoders and Energy-based Models", In International Conference on Learning Representations, 2021, 33 pages.
Parmar et al., "Dual Contradistinctive Generative Autoencoder", arXiv:2011.10063, 2020, 18 pages.
Jun et al., "Distribution Augmentation for Generative Modeling", In International Conference on Machine Learning, PMLR, 2020, 14 pages.
Child et al., "Generating Long Sequences with Sparse Transformers", arXiv:1904.10509, 2019, 10 pages.
Razavi et al., "Preventing Posterior Collapse with Delta-Vaes", In The International Conference on Learning Representations (ICLR), 2019, 24 pages.
Chen et al., "PixelSNAIL: An Improved Autoregressive Generative Model", In International Conference on Machine earning, 2018, 9 pages.
Salimans et al., "PixelCNN++: Improving the PixelCNN with Discretized Logistic Mixture Likelihood and other Modifications", arXiv:1701.05517, 2017, 10 pages.
Gong et al., "AutoGAN: Neural Architecture Search for Generative Adversarial Networks", In The IEEE International Conference on Computer Vision (ICCV), arXiv:1908.03835, 2019, 11 pages.
Karras et al., "Training Generative Adversarial Networks with Limited Data", In NeurIPS, arXiv:2006.06676, 2020, 37 pages.
Kingma et al., "Glow: Generative Flow with Invertible 1×1 Convolutions", Advances in Neural Information Processing Systems, 2018, 10 pages.
Menick et al., "Generating High Fidelity Images with Subscale Pixel Networks and Multidimensional Upscaling", In International Conference on Learning Representations, 2019, 15 pages.
Pidhorskyi et al., "Adversarial Latent Autoencoders", In Proceedings of the IEEE Computer Society Conference on Computer Vision and Pattern Recognition (CVPR), arXiv:2004.04467, 2020, 10 pages.
Karras et al., "Progressive Growing of GANs for Improved Quality, Stability, and Variation", In International Conference on Learning Representations, arXiv:1710.10196, 2018, 26 pages.
Krizhevsky, Alex, "Learning Multiple Layers of Features from Tiny Images", Apr. 8, 2009, 60 pages.
SØnderby et al., "Ladder Variational Autoencoders", In Advances in Neural Information Processing Systems, 2016, 9 pages.
Sadeghi et al., "PixelVAE++: Improved PixelVAE with Discrete Prior", arXiv:1908.09948, 2019, 12 pages.
Ma et al., "MAE: Mutual Posterior-Divergence Regularization for Variational Autoencoders", In The International Conference on Learning Representations (ICLR), 2019, 16 pages.
Lecun et al., "The Mnist Database of Handwritten Digits", Retrieved from http://yann.lecun.com/exdb/mnist/, on Jan. 11, 2022, 1998, 7 pages.
Bailey, Jason, "The Tools of Generative Art, from Flash to Neural Networks", Art in America, Jan. 8, 2020, 7 pages.
Vaccari et al., "Deepfakes and Disinformation: Exploring the Impact of Synthetic Political Video on Deception, Uncertainty, and Trust in News", Social Media+ Society, 2020, 13 pages.
Bowman et al., "Generating Sentences from a Continuous Space", In Proceedings of The 20th SIGNLL Conference on Computational Natural Language Learning, 2016, pp. 10-21.
Li et al., "OPTIMUS: Organizing Sentences via Pre-Trained Modeling of a Latent Space", In EMNLP, arXiv:2004.04092, 2020, 22 pages.
Dhariwal et al., "Jukebox: A Generative Model for Music", arXiv:2005.00341, 2020, 20 pages.
Sanchez-Lengeling et al., "Inverse Molecular Design Using Machine Learning: Generative Models for Matter Engineering", Science, vol. 361, Jul. 27, 2018, pp. 360-365.
Alperstein et al., "All Smiles Variational Autoencoder" arXiv:1905.13343, 2019, 23 pages.
Kingma et al., "Semi-supervised Learning with Deep Generative Models", In Advances in Neural Information Processing Systems, 2014, 9 pages.
Odena, Augustus, "Semi-Supervised Learning with Generative Adversarial Networks" arXiv:1606.01583, 2016, 3 pages.
Li et al., "Semantic Segmentation with Generative Models: Semi-supervised learning and Strong Out-of-domain Generalization", In Conference on Computer Vision and Pattern Recognition (CVPR), 2021, pp. 8300-8311.
Särkkä et al., "Applied Stochastic Differential Equations", Institute of Mathematical Statistics Textbooks, Cambridge University Press, United Kingdom, 2019, 324 pages.

(56) References Cited

OTHER PUBLICATIONS

Anderson, Brian D.O., "Reverse-time Diffusion Equation Models" Stochastic Process and their Applications, vol. 12. No. 3, 1982, pp. 313-326.

Grathwohl et al., "FFJORD: Free-form Continuous Dynamics for Scalable Reversible Generative Models", International Conference on Learning Representations, 2019, 13 pages.

Zhang, Richard, "Making Convolutional Networks Shift-Invariant Again", In ICML, arXiv:1904.11486, 2019, 17 pages.

Kingma et al., "Adam: A Method for Stochastic Optimization", arXiv:1412.6980, ICLR, 2014, 15 pages.

Dormand et al., "A Family of Embedded Runge-Kutta Formulae", Journal of Computational and Applied Mathematics, vol. 6, No. 1, 1980, pp. 19-26.

Non Final Office Action received for U.S. Appl. No. 17/681,632 dated Jan. 28, 2025, 54 pages.

Karatsiolis et al., "Conditional Generative Denoising Autoencoder," IEEE Transactions on Neural Networks and Learning Systems, Doi: 10.1109/TNNLS.2019.2952203, vol. 31, No. 10, Oct. 2020, pp. 4117-4129.

\* cited by examiner

SCORE-BASED GENERATIVE MODELING IN LATENT SPACE

CROSS-REFERENCE TO RELATED APPLICATIONS

This application claims benefit of United States Provisional Patent Application titled "SCORE-BASED GENERATIVE MODELING IN LATENT SPACE," filed Jun. 8, 2021, and having Ser. No. 63/208,304. The subject matter of this related application is hereby incorporated herein by reference.

BACKGROUND

Field of the Various Embodiments

Embodiments of the present disclosure relate generally to machine learning and computer science and, more specifically, to score-based generative modeling in latent space.

DESCRIPTION OF THE RELATED ART

In machine learning, generative models typically include deep neural networks and/or other types of machine learning models that are trained to generate new instances of data. For example, a generative model could be trained on a training dataset that includes a large number of images of cats. During training, the generative model "learns" the visual attributes of the various cats depicted in the images. These learned visual attributes could then be used by the generative model to produce new images of cats that are not found in the training dataset.

A score-based generative model (SGM) is one type of generative model. An SGM typically includes a forward diffusion process that gradually perturbs input data into noise that follows a certain noise distribution over a series of time steps. The SGM also includes a reverse denoising process that generates new data by iteratively converting random noise from the noise distribution into the new data over a different series of time steps. The reverse denoising process can be performed by reversing the time steps of the forward diffusion process. For example, the forward diffusion process could be used to gradually add noise to an image of a cat until an image of white noise is produced. The reverse denoising process could then be used to gradually remove noise from an image of white noise until an image of a cat is produced.

The operation of an SGM can be represented using a set of complex equations called stochastic differential equations (SDEs). A first SDE can be used to model the forward diffusion process of an SGM as a fixed set of trajectories from a set of data to a corresponding set of points in a noise distribution. A second SDE that is the reverse of the first SDE can be used to model the reverse denoising process of the SGM that converts a given point from the noise distribution back into data. The second SDE can be approximated by training a neural network to learn a score function that is included in the second SDE. The trained neural network can then be iteratively executed to evaluate the score function over multiple time steps that convert a noise sample into a new data sample. For example, the first SDE could be used to convert images of cats in a training dataset into images of white noise. The neural network could then be trained to estimate scores produced by the second SDE while converting the white noise images back into corresponding images of cats. After the neural network is trained, the neural network could generate additional scores that are used to convert a random white noise image into an image of a cat that is not included in the training dataset.

One drawback of using SGMs to generate new data is that generating a new data sample from a noise sample is slow and computationally expensive. In that regard, a neural network that learns the score function included in a second SDE corresponding to the reverse denoising process of an SGM is typically executed thousands of times to generate a large number of score values when converting the noise sample into the data sample. Consequently, synthesizing new data using an SGM can be multiple orders of magnitude slower and more resource-intensive than synthesizing new data using other types of generative models.

Another drawback of using SGMs to generate new data is that, because SGMs are represented using SDEs that involve derivatives, SGMs can be used only with continuous data from which derivatives can be computed. Accordingly, SGMs cannot be used to generate graphs, molecules, text, binary data, categorical data, and/or other types of non-continuous data.

As the foregoing illustrates, what is needed in the art are more effective techniques for generating new data using SGMs.

SUMMARY

One embodiment of the present invention sets forth a technique for generating data. The technique includes sampling from a first distribution associated with a score-based generative model to generate a first set of values. The technique also includes performing one or more denoising operations via the score-based generative model to convert the first set of values into a first set of latent variable values associated with a latent space. The technique further includes converting the first set of latent variable values into a generative output.

One technical advantage of the disclosed techniques relative to the prior art is that, with the disclosed techniques, a score-based generative model generates mappings between a distribution of latent variables in a latent space and a base distribution that is similar to the distribution of latent variables in the latent space. The mappings can then be advantageously leveraged when generating data samples. In particular, the mappings allow the score-based generative model to perform fewer neural network evaluations and incur substantially less resource overhead when converting samples from the base distribution into a set of latent variable values from which data samples can be generated, relative to prior art approaches where thousands of neural network evaluations are performed via score-based generative models when converting noise samples into data samples from complex data distributions. Another advantage of the disclosed techniques is that, because the latent space associated with the latent variable values is continuous, an SGM can be used in a generative model that learns to generate non-continuous data. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
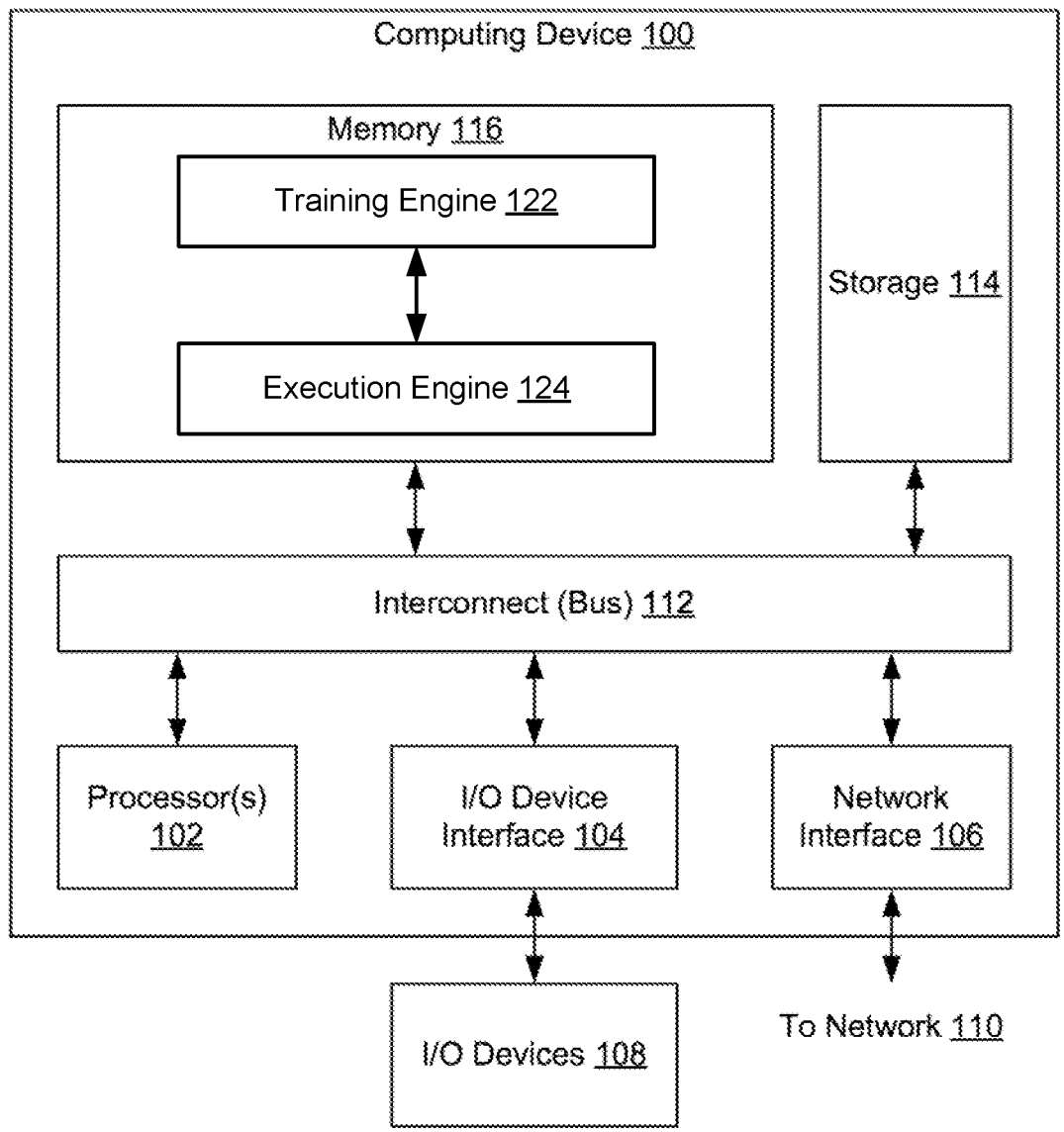
FIG. 1 illustrates a computing device configured to implement one or more aspects of the various embodiments.

In the following description, numerous specific details are set forth to provide a more thorough understanding of the various embodiments. However, it will be apparent to one of skill in the art that the inventive concepts may be practiced without one or more of these specific details.

General Overview

Generative models typically include deep neural networks and/or other types of machine learning models that are trained to generate new instances of data. For example, a generative model could be trained on a training dataset that includes a large number of images of cats. During training, the generative model "learns" patterns in the faces, fur, bodies, expressions, poses, and/or other visual attributes of the cats in the images. These learned patterns could then be used by the generative model to produce new images of cats that are not found in the training dataset.

A score-based generative model (SGM) is a type of generative model. A SGM typically includes a forward diffusion process that gradually perturbs input data into noise over a series of time steps. The SGM also includes a reverse denoising process that generates new data by iteratively converting random noise into the new data over a different series of time steps. For example, the forward diffusion process could be used to gradually add noise to an image of a cat until an image of white noise is produced. The reverse denoising process could be used to gradually remove noise from an image of white noise until an image of a cat is produced.

The operation of an SGM can be represented using a set of complex equations named stochastic differential equations (SDEs). A first SDE models the forward diffusion process as a fixed set of trajectories from a set of data to a corresponding set of noise. A second SDE that is the reverse of the first SDE models the reverse denoising process that converts the noise back into data. The second SDE can be approximated by training a neural network to learn a score function in the second SDE. The trained neural network can then be iteratively executed to evaluate the score function over multiple time steps that convert a noise sample into a new data sample. For example, the first SDE could be used to convert images of cats in a training dataset into images of white noise. The neural network could be trained to estimate scores produced by the second SDE during conversion of the white noise images back into the corresponding images of cats. After the neural network is trained, the neural network could generate additional scores that are used to convert a random white noise image into an image of a cat that is not included in the training dataset.

SGMs and other generative models can be used in various real-world applications. First, a SGM can be used to produce images, music, and/or other content that can be used in advertisements, publications, games, videos, and/or other types of media. Second, an SGM can be used in computer graphics applications. For example, an SGM could be used to render two-dimensional (2D) or three-dimensional (3D) characters, objects, and/or scenes instead of requiring users to explicitly draw or create the 2D or 3D content. Third, an SGM can be used to generate or augment data. For example, the time steps in the forward diffusion process could be "integrated" into a "latent" representation of an image of a person. The latent representation can be adjusted, and another integration related to the reverse denoising process can be used to convert the adjusted latent representation into another image in which the appearance of the person (e.g., facial expression, gender, facial features, hair, skin, clothing, accessories, etc.) is changed. In another example, the SGM could be used to generate new images that are included in training data for another machine learning model. Fourth, the SGM can be used to analyze or aggregate the attributes of a given training dataset. For example, visual attributes of faces, animals, and/or objects learned by an SGM from a set of images could be analyzed to better understand the visual attributes and/or improve the performance of machine learning models that distinguish between different types of objects in images.

One drawback of using SGMs to generate new data is that generating a new data sample from a noise sample is slow and computationally expensive. In that regard, thousands of function evaluations are typically performed via the neural network that learns the score function in the second SDE to generate score values that are used to convert the noise sample into the data sample. Consequently, synthesizing new data via an SGM can be multiple orders of magnitude slower than synthesizing new data via other types of generative models.

Another drawback of using SGMs to generate new data is that, because the SGMs are represented using SDEs that involve derivatives, the SGMs can be used only with continuous data from which derivatives can be computed. Accordingly, SGMs cannot be used to generate graphs, molecules, text, binary data, categorical data, and/or other non-continuous data.

To reduce the resource overhead and complexity associated with executing an SGM, another machine learning model is trained to convert between data points in a training dataset and values of "latent variables" that represent latent attributes of the data points in the training dataset. The SGM can then be trained to convert between the latent variable values and noise samples. To reduce the number of time steps and/or resource overhead required to convert between the latent variable values and noise samples, the other machine learning model can be trained to generate a distribution of latent variable values that is similar to the distribution of noise samples associated with the SGM. Further, because the latent space associated with the latent variable values is continuous, the other machine learning model can be used to convert non-continuous data into a form that can be used with the SGM.

In some embodiments, the other machine learning model is a variational autoencoder (VAE) that is implemented using a number of neural networks. These neural networks can include an encoder neural network that is trained to convert data points in the training dataset into latent variable values. These neural networks can also include a prior neural network that is trained to learn a distribution of the latent variables associated with the training dataset, where the distribution of latent variables represents variations and occurrences of the different attributes in the training dataset. These neural networks can additionally include a decoder neural network that is trained to convert the latent variable values generated by the encoder neural network back into data points that are substantially identical to data points in the training dataset.

More specifically, the prior neural network in the VAE is implemented as an SGM. During training, the encoder network in the VAE learns to convert a given data point in a training dataset into a set of latent variables, and the forward diffusion process in the SGM is used to convert the set of latent variables into a set of noise values. The prior neural network learns a score function that is used by the reverse denoising process in the SGM to convert from the set of noise values into the set of latent variables, and the decoder network in the VAE learns to convert the set of latent variables back into the data point.

The trained SGM-based prior neural network and decoder neural network can then be used to produce generative output that resembles the data in the training dataset. In particular, the prior neural network is used to generate a series of score values that are used to convert a set of noise values into a set of latent variable values. The decoder neural network is then used to convert the set of latent variable values into a data point. For example, the prior network could be used to generate score values that are used to convert the set of noise values into the set of latent variables over a series of time steps. The decoder network could convert the set of latent variables into an image that resembles a set of images in the training dataset.

System Overview

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and execution engine 124 that reside in a memory 116. It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of receiving input, such as a keyboard, a mouse, a touchpad, and/or a microphone, as well as devices capable of providing output, such as a display device and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

Training engine 122 includes functionality to train a generative model on a training dataset, and execution engine 124 includes functionality to execute one or more portions of the generative model to generate additional data that is not found in the training dataset. For example, training engine 122 could train a number of neural networks included in the generative model on a set of training images, and execution engine 124 could execute a portion of the trained neural networks to produce additional images that are not found in the set of training images.

In some embodiments, the generative model includes a variational autoencoder (VAE) with a prior that is implemented using a score-based generative model (SGM). Training engine 122 trains an encoder in the VAE to convert data points in the training dataset into values of latent variables in a latent space, where each latent variable represents an attribute of the data points in the training dataset. Training engine 122 trains a decoder in the VAE to convert the latent variable values back into data points that are substantially identical to data points in the training dataset. Training engine 122 additionally trains a prior represented by one or more portions of the SGM to convert between the latent variables and noise values in a noise distribution.

Execution engine 124 then uses the trained SGM prior and decoder to generate additional data. More specifically, execution engine 124 uses the trained SGM prior to convert a sample from a standard Normal noise distribution into a set of latent variable values. Execution engine 124 then uses the trained decoder to convert the set of latent variable values into a data point that is not found in the training dataset. As described in further detail below, the latent space associated with the latent variables is enforced to be as smooth and unimodal as possible, which reduces the number of neural network evaluations required to convert between the latent space and the noise distribution and allows the SGM to be used with non-continuous data.

Score-Based Generative Modeling in Latent Space

Figure 2A:
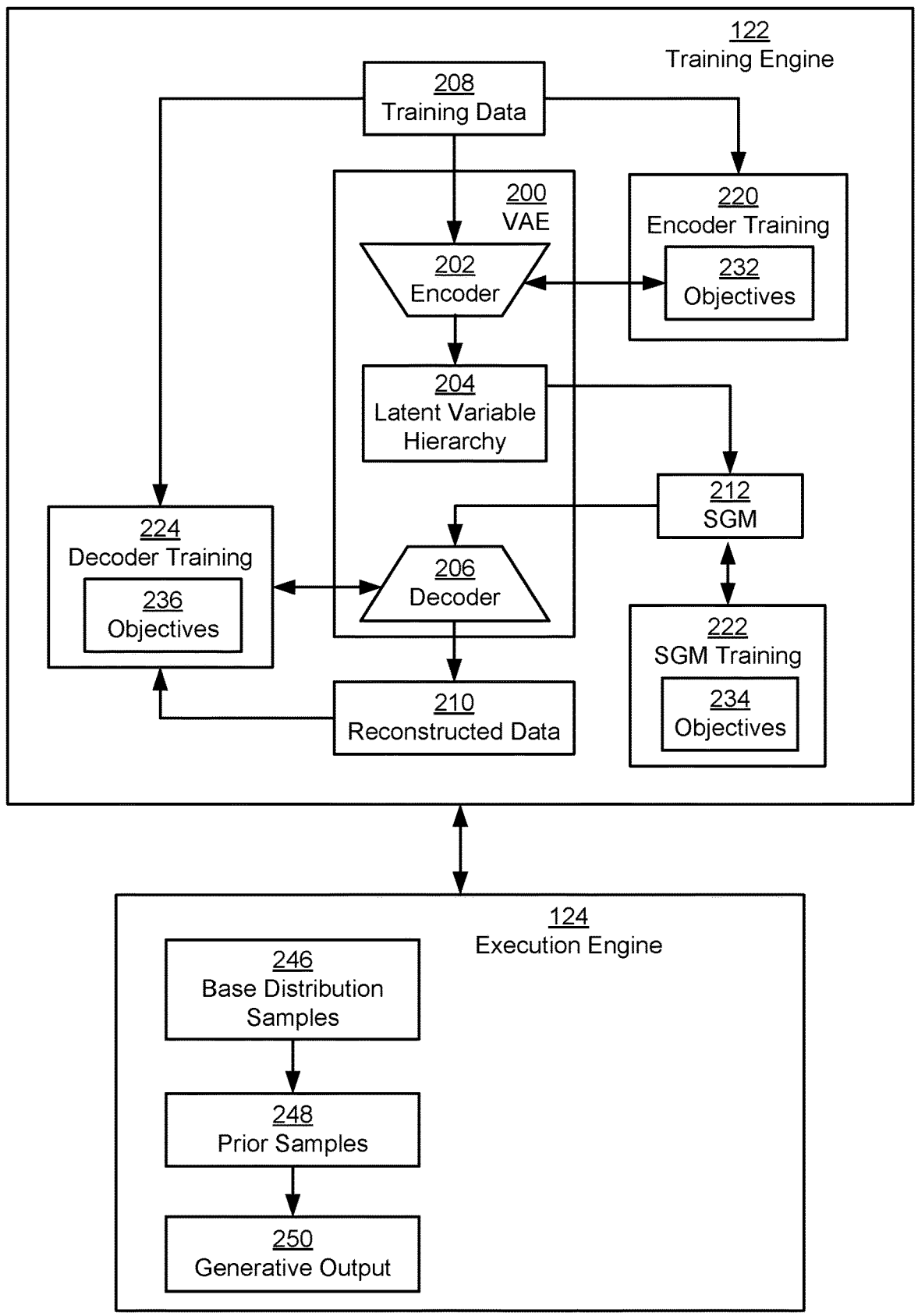
FIG. 2A is a more detailed illustration of the training engine and execution engine of FIG. 1, according to various embodiments.

FIG. 2A is a more detailed illustration of functionality provided by training engine 122 and execution engine 124 of FIG. 1, according to various embodiments. Training engine 122 trains a VAE 200 that learns a distribution of a set of training data 208, and execution engine 124 executes one or more portions of VAE 200 to produce generative output 250 that includes additional data points in the distribution that are not found in training data 208.

As shown, VAE 200 includes a number of neural networks: an encoder 202, a prior that is implemented as an SGM 212, and a decoder 206. Encoder 202 "encodes" a set of training data 208 into latent variable values, the prior learns the distribution of latent variables outputted by encoder 202, and decoder 206 "decodes" latent variable values sampled from the distribution into reconstructed data 210 that substantially reproduces training data 208. For example, training data 208 could include images of human faces, animals, vehicles, and/or other types of objects; speech, music, and/or other audio; articles, posts, written documents, and/or other text; 3D point clouds, meshes, and/or models; and/or other types of content or data. When training data 208 includes images of human faces, encoder 202 could convert pixel values in each image into a smaller number of latent variables representing inferred visual attributes of the objects and/or images (e.g., skin tones, hair colors and styles, shapes and sizes of facial features, gender, facial expressions, and/or other characteristics of human faces in the images), the prior could learn the means and variances of the distribution of latent variables across multiple images in training data 208, and decoder 206 could convert latent variables sampled from the latent variable distribution and/or outputted by encoder 202 into reconstructions of images in training data 208.

The generative operation of VAE 200 may be represented using the following probability model:

$$p_\theta(x,z) = p_\theta(z) p_\theta(x|z), \quad (1)$$

where $p_\theta(z)$ is a prior distribution learned by the prior over latent variables z and $p_\theta(x|z)$ is the likelihood function, or decoder 206, that generates data x given latent variables z. In other words, latent variables are sampled from $p_\theta(z)$ and the data x has a likelihood distribution that is conditioned on the sampled latent variables z. The probability model includes a posterior $p_\theta(z|x)$, which is used to infer values of the latent variables z. Because $p_\theta(z|x)$ is intractable, another distribution $q_\phi(z|x)$ learned by encoder 202 is used to approximate $p_\theta(z|x)$.

In some embodiments, VAE 200 is a hierarchical VAE that uses deep neural networks for encoder 202, the prior, and decoder 206. The hierarchical VAE includes a latent variable hierarchy 204 that partitions latent variables into a sequence of disjoint groups. Within latent variable hierarchy 204, a sample from a given group of latent variables is combined with a feature map and passed to the following group of latent variables in the hierarchy for use in generating a sample from the following group.

Continuing with the probability model represented by Equation 1, partitioning of the latent variables may be represented by $z=\{z_1, z_2, \ldots, z_L\}$, where L is the number of groups. Within latent variable hierarchy 204, in some embodiments, the prior is represented by $p(z)=\Pi_l p(z_l|z_{<l})$, and the approximate posterior is represented by $q(z|x)=\Pi_l q(z_l|z_{<l}, x)$, where:

$$p(z_l|z_{<l}) = \mathcal{N}(z_l; \mu_l(z_{<l}), \sigma_l^2(z_{<l})I) \quad (2)$$

$$q(z_l|z_{<l}, x) = \mathcal{N}(z_l; \mu'_l(z_{<l}, x), \sigma'_l^2(z_{<l}, x)I) \quad (3)$$

In addition, $q(z_{<l}) \triangleq \mathbb{E}_{p_d(x)}[q(z_{<l}|x)]$ is the aggregate approximate posterior up to the (l−1)th group, and $q(z_l|z_{<l}) \triangleq \mathbb{E}_{p_d(x)}[q(z_l|z_{<l}, x)]$ is the aggregate conditional distribution for the lth group.

In some embodiments, encoder 202 includes a bottom-up model and a top-down model that perform bidirectional inference of the groups of latent variables based on training data 208. The top-down model is then reused as a prior to infer latent variable values that are inputted into decoder 206 to produce reconstructed data 210 and/or generative output 250. The architectures of encoder 202 and decoder 206 are described in further detail below with respect to FIGS. 3A-3B.

In one or more embodiments, the prior of VAE 200 is implemented by an SGM 212. The operation of SGM 212 is represented by a forward diffusion process that sequentially adds noise to data from a given distribution until the data is transformed into a noise distribution. SGM 212 also is represented by a reverse denoising process that iteratively removes noise from points in the noise distribution to synthesize new data. The forward diffusion process can be modeled using a continuous-time stochastic differential equation (SDE), and the reverse denoising process can be modeled using the reverse of this continuous-time SDE.

For example, the forward diffusion process could be represented by $\{z_t\}_{t=0}^{t=1}$ for a continuous time variable $t \in [0,1]$, where $z_0$ is a starting variable and $z_t$ is the perturbation of the starting variable at time t. The forward diffusion process could be defined by the following Itô SDE:

$$dz = f(z,t)dt + g(t)dw \quad (4)$$

where $f: \mathbb{R} \to \mathbb{R}$ and $g: \mathbb{R} \to \mathbb{R}$ are scalar drift and diffusion coefficients, respectively, and w is the standard Wiener process (e.g., Brownian motion). f(z, t) and g(t) can be designed so that $z_1 \sim \mathcal{N}(z_1; 0, I)$ follows a Normal distribution with a fixed mean and variance at the end of the diffusion process.

Continuing with the above example, the SDE in Equation 4 can be converted into a generative model by first sampling from $z_1 \sim \mathcal{N}(z_1; 0, I)$ and then performing the reverse denoising process, which is defined by the following reverse-time SDE:

$$dz = [f(z,t) - g^2(t)\nabla_{z_t} \log q(z_t)]dt + g(t)d\bar{w}, \quad (5)$$

where $\bar{w}$ is a standard Wiener process when time flows backwards from 1 to 0, and dt is an infinitesimal negative time step. The reverse-time SDE utilizes knowledge of $\nabla_{z_t} \log q(z_t)$, which is a "score function" that corresponds to the gradient of the log-density of the perturbed variable at time t. The reverse-time SDE additionally includes a corresponding "probability flow" ordinary differential equation (ODE) that generates the same marginal probability distributions $q(z_t)$ when acting upon the same prior distribution $q(z_1)$. This probability flow ODE is given by:

$$dz = \left[f(z,t) - \frac{g^2(t)}{2}\nabla_{z_t} \log q(z_t)\right]dt \quad (6)$$

In some embodiments, the score function is estimated by training SGM 212 on samples from the given distribution and the following score matching objective (e.g., objectives 234):

$$\min_\theta \mathbb{E}_{t \sim \mathcal{U}[0,1]}\left[\lambda(t)\mathbb{E}_{q(z_0)}\mathbb{E}_{q(z_t|z_0)}\left[\left\|\nabla_{z_t} \log q(z_t) - \nabla_{z_t} \log p_\theta(z_t)\right\|_2^2\right]\right] \quad (7)$$

The above score matching objective is used to train the parametric score function $\nabla_{z_t} \log p_\theta(z_t)$ at time $t \sim \mathcal{U}[0,1]$ for a given positive weighting coefficient $\lambda(t)$. ($z_0$) is the $z_0$-generating distribution, and $q(z_t|z_0)$ is the diffusion kernel, which is available in closed form for certain f(t) and g(t).

Because $\nabla_{z_t} \log q(z_t)$ is not analytically available, a denoising score matching technique can be used to convert the objective in Equation 4 into the following:

$$\min_\theta \mathbb{E}_{t \sim \mathcal{U}[0,1]}\left[\lambda(t)\mathbb{E}_{q(z_0)}\mathbb{E}_{q(z_t|z_0)}\left[\left\|\nabla_{z_t} \log q(z_t|z_0) - \nabla_{z_t} \log p_\theta(z_t)\right\|_2^2\right]\right] + C \quad (8)$$

where $C =$ $$\min_\theta \mathbb{E}_{t \sim \mathcal{U}[0,1]}\left[\lambda(t)\mathbb{E}_{q(z_0)}\mathbb{E}_{q(z_t|z_0)}\left[\left\|\nabla_{z_t} \log q(z_t)\right\|_2^2 - \left\|\nabla_{z_t} \log q(z_t|z_0)\right\|_2^2\right]\right] \text{ is}$$

independent of θ, making the minimizations in Equations 7 and 8 equivalent. For $\lambda(t) = g^2(t)/2$, these minimizations correspond to approximate maximum likelihood training based on an upper bound on the Kullback-Leibler (KL) divergence between the target distribution and the distribution defined by the reverse-time generative SDE with the learned score function. More specifically, the score matching objective represented by Equation 6 can be rewritten as:

$$KL(q(z_0) \| p_\theta(z_0)) \leq \quad (9)$$

$$\mathbb{E}_{t \sim \mathcal{U}[0,1]}\left[\frac{g(t)^2}{2}\mathbb{E}_{q(z_0)}\mathbb{E}_{q(z_t|z_0)}\left[\left\|\nabla_{z_t} \log q(z_t) - \nabla_{z_t} \log p_\theta(z_t)\right\|_2^2\right]\right]$$

Equation 9 can be transformed into denoising score matching in a similar manner to Equation 7.

As mentioned above, SGM 212 is used to model the prior distribution of latent variables in VAE 200. In particular, encoder 202 can be represented by $q_\phi(z_o|x)$, SGM 212 can be represented by $p_\theta(z_0)$, and decoder 206 can be represented by $p_\psi(x|z_o)$. SGM 212 leverages the diffusion process defined by Equation 4 and diffuses samples $z_0 \sim q_\phi(z_o|x)$ in the latent space associated with latent variable hierarchy 204 to the standard Normal distribution $p(z_1) \sim \mathcal{N}(z_1; 0, I)$.

In one or more embodiments, the hierarchical prior represented by latent variable hierarchy 204, is converted into $\mathcal{N}(z_0; 0, I)$ using a change of variables. More specifically, the latent variables in latent variable hierarchy 204 can be reparameterized by introducing $$\epsilon_l = \frac{z_l - \mu_l(z_{<l})}{\sigma_l(z_{<l})}.$$

With this parameterization, the equivalent VAE 200 includes the following:

$$p(\epsilon_l) = \mathcal{N}(\epsilon_l; 0, I) \quad (10)$$

$$q(\epsilon_l | \epsilon_{<l}, x) = \mathcal{N}\left(\epsilon_l; \frac{\mu'_l(z_{<l}, x) - \mu_l(z_{<l})}{\sigma_l(z_{<l})}, \frac{\sigma'^2_l(z_{<l}, x)}{\sigma^2_l(z_{<l})}I\right)$$

where $z_l = \mu_l(z_{<l}) + \sigma_l(z_{<l})\epsilon_l$ and $\epsilon_l$ represents latent variables with a standard Normal prior.

In some embodiments, residual parameterization of encoder 202 in the hierarchical VAE 200 is performed to improve generative performance. This residual parameterization includes the following representation of encoder 202:

$$q(z_l|z_{<l},x) = \mathcal{N}(z_l; \mu_l(z_{<l}) + \sigma_l(z_{<l})\Delta\mu'_l(z_{<l},x), \sigma^2_l(z_{<l})\Delta\sigma'^2_l(z_{<l},x)I) \quad (12)$$

where encoder 202 is tasked to predict the residual parameters $\Delta\mu'_l(z_{<l}, x)$ and $\Delta\sigma'^2_l(z_{<l}, x)$. Using the same reparameterization of $$\epsilon_l = \frac{z_l - \mu_l(z_{<l})}{\sigma_l(z_{<l})},$$

the equivalent VAE 200 includes the following:

$$p(\epsilon_l) = \mathcal{N}(\epsilon_l; 0, I) \quad (13)$$

$$q(\epsilon_l|\epsilon_{<l},x) = \mathcal{N}(\epsilon_l; \Delta\mu'_l(z_{<l},x), \Delta\sigma'^2_l(z_{<l},x)I) \quad (14)$$

where $z_l = \mu_l(z_{<l}) + \sigma_l(z_{<l})\epsilon_l$. Consequently, the residual parameterization of encoder 202 directly predicts the mean and variance for the $\epsilon_l$ distributions.

The generative model uses the reverse SDE represented by Equation 5 (or the corresponding probability flow ODE represented by Equation 6) to sample from $p_\theta(z_0)$ with time-dependent score function $\nabla_{z_t} \log p_\theta(z_t)$. The generative model also uses the decoder $p_\psi(x|z_o)$ to map the synthesized encodings $z_0$ to the data space associated with training data 208. This generative process can be represented using the following:

$$p(z_0|x) = p_\theta(z_0) p_\psi(x|z_o) \tag{15}$$

Figure 2B:
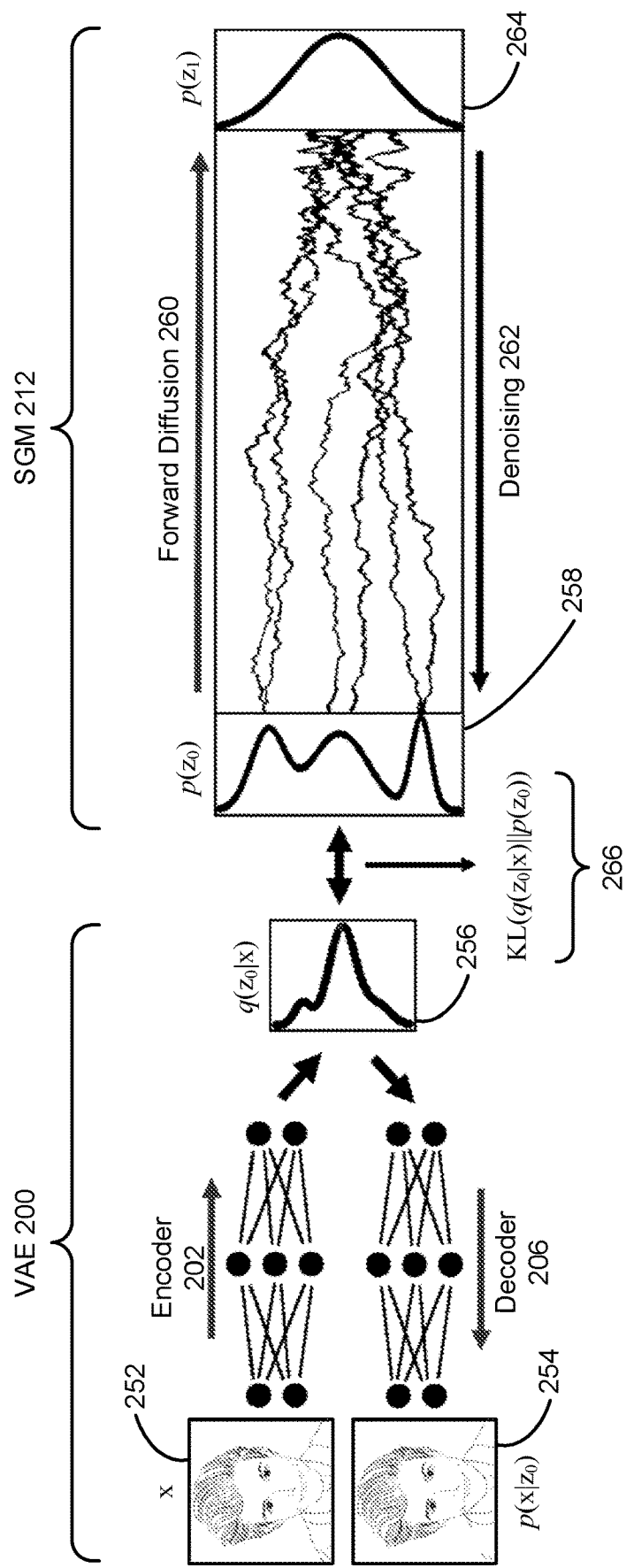
FIG. 2B illustrates the operation of the VAE and SGM of FIG. 2A, according to various embodiments.

FIG. 2B illustrates the operation of VAE 200 and SGM 212 of FIG. 2A, according to various embodiments. As shown in FIG. 2B, encoder 202 converts a data point 252 in training data 208 into an approximate posterior distribution 256 $q(z_0|x)$ of latent variables $z_0$. For example, encoder 202 could convert pixel values in an image into groups of latent variable values in a lower-dimensional latent variable hierarchy 204.

SGM 212 performs a forward diffusion 260 process that gradually adds noise to these latent variables over a series of time steps. For example, SGM 212 could perform forward diffusion 260 on a concatenation of latent variable values from all groups in latent variable hierarchy 204. When groups of latent variables in latent variable hierarchy 204 are associated with multiple spatial resolutions, SGM 212 could perform forward diffusion 260 on latent variable groups associated with the smallest resolution, under the assumption that remaining groups in latent variable hierarchy 204 have a standard normal distribution. The result of forward diffusion 260 is a point $z_1$ from a base distribution 264 $p(z_1) = \mathcal{N}(z_1; 0, I)$.

SGM 212 also performs a reverse denoising 262 process that converts a given point $z_1$ from base distribution 264 into a corresponding set of latent variables $z_o$ from a prior distribution 258 denoted by $p(z_0)$. During training, a KL divergence 266 between this prior distribution 258 and the approximate posterior distribution 256 is minimized, as described in further detail below.

Decoder 206 is used to convert the set of latent variables $z_0$ into a reconstruction 254 of data point 252. For example, decoder 206 could convert one or more groups of latent variables from latent variable hierarchy 204 into a likelihood $p(x|z_0)$ that includes a distribution of pixel values for individual pixels in an output image with the same dimensions as an input image corresponding to data point 252. The output image could then be generated by sampling pixel values from the likelihood outputted by decoder 206.

Returning to the discussion of FIG. 2A, training engine 122 performs training operations that update $\{\phi, \theta, \psi\}$ as the parameters of encoder 202 $q_\phi(z_o|x)$, score function $\nabla_{z_t} \log p_\theta(z_0)$, and decoder 206 $p_\psi(x|z_o)$, respectively. As shown in FIG. 1, these training operations can include encoder training 220 that updates the parameters of encoder 202 based on one or more objectives 232, SGM training 222 that updates the parameters of SGM 212 based on one or more objectives 234, and decoder training 224 that updates the parameters of decoder 206 based on one or more objectives 236.

In some embodiments, objectives 232-236 include a variational upper bound on the negative data log-likelihood $p(x)$:

$$\mathcal{L}(x,\phi,\theta,\psi) = \mathbb{E}_{q(z_0|x)}[-\log p_\psi(x|z_o)] + KL(q_\phi(z_0|x)|p_\theta(z_0)) \tag{16}$$

In the above representation, $\mathbb{E}_{q(z_0|x)}[-\log p_\psi(x|z_o)]$ is a reconstruction term that corresponds to one or more objectives 236 used to update parameters $\psi$ of decoder 206 during decoder training 224. For example, the reconstruction term could be used to maximize the probability of a data point x in training data 208 within a likelihood $p_\psi(x|z_o)$ generated by decoder 206, given latent variables $z_o$ generated by encoder 202 from the same data point. $KL(q_\phi(z_0|x)|p_\theta(z_0))$ is the KL divergence between the approximate posterior distribution $q_\phi(z_0|x)$ of latent variables learned by encoder 202 and the prior distribution $p_\theta(z_0)$ defined by the reverse-time generative SDE associated with SGM 212. In addition, $q_\phi(z_0|x)$ approximates the true posterior $p(z_0|x)$.

Equation 16 can be rewritten in the following form:

$$\mathcal{L}(x,\phi,\theta,\psi) = \mathbb{E}_{q(z_0|x)}[-\log p_\psi(x|z_o)] + \mathbb{E}_{q(z_0|x)}[q_\phi(z_0|x)] + \mathbb{E}_{q(z_0|x)}[p_\theta(z_0)] \tag{17}$$

In Equation 17, the KL divergence is decomposed into a negative encoder entropy term $\mathbb{E}_{q(z_0|x)}[q_\phi(z_0|x)]$ that corresponds to one or more objectives 232 used to update parameters $\phi$ of encoder 202 during encoder training 220, and a cross-entropy term $\mathbb{E}_{q(z_0|x)}[p_\theta(z_0)]$ that corresponds to one or more objectives 234 used to update parameters $\theta$ of SGM 212 during SGM training 222 and/or parameters $\phi$ of encoder 202 during encoder training 220. This decomposition circumvents issues with directly using the KL divergence, which involves a marginal score $\nabla_{z_t} \log q(z_t)$ that is unavailable analytically for common non-Normal distributions $q(z_0)$ such as Normalizing flows.

In some embodiments, the cross-entropy term in Equation 17 includes the following representation:

$$CE(q(z_0|x)|p(z_0)) = \mathbb{E}_{t \sim \mathcal{U}[0,1]} \left[ \frac{g(t)^2}{2} \mathbb{E}_{q(z_t,z_0|x)} [\|\nabla_{z_t} \log q(z_t|z_0) - \nabla_{z_t} \log p(z_t)\|_2^2] \right] + \frac{D}{2} \log(2\pi e \sigma_0^2) \tag{18}$$

In the above equation, $q(z_0|x)$ and $p(z_0)$ are two distributions defined in the continuous space $\mathbb{R}^D$. The marginal distributions of diffused samples under the SDE in Equation 5 at time t are denoted by $q(z_t|x)$ and $p(z_t)$, respectively. These marginal distributions are assumed to be smooth with at most polynomial growth at $z_t \to \pm\infty$. Additionally, $q(z_t, z_0|x) = q(z_t|z_0) q(z_0|x)$ and a Normal transition kernel $q(z_t|z_0) = \mathcal{N}(z_t; \mu_t(z_0), \sigma_t^2 I)$, where $\mu_t$ and $\sigma_t^2$ are obtained from f(t) and g(t) for a fixed initial variance $\sigma_0^2$ at t=0.

Unlike the KL divergence in Equation 9, Equation 18 lacks any terms that depend on the marginal score $\nabla_{z_t} \log q(z_t)$. Consequently, Equation 18 can be used as one or more objectives 234 for optimizing the prior represented by SGM 212 $p_\theta(z_0)$ and/or as one or more objectives 232 for optimizing the distribution of encoder 202 $q_\phi(z_o|x)$.

More specifically, Equation 18 represents the estimation of the cross entropy between $q(z_0|x)$ and $p(z_0)$ with denoising score matching. This estimation corresponds to drawing samples from a potentially complex encoding distribution $q(z_0)$, adding Gaussian noise with small initial variance $\sigma_0^2$ to obtain a well-defined initial distribution, and smoothly perturbing the sampled encodings using a diffusion process while learning a denoising model represented by SGM 212. The term $\nabla_{z_t} \log p(z_t)$ corresponds to a score function that originates from diffusing the initial $p(z_0)$ distribution and is modeled by a neural network corresponding to the SGM-based prior $p_\theta(z_0)$. With the learned score function $\nabla_{z_t} \log p_\theta(z_t)$, the SGM-based prior is defined via a generative reverse-time SDE (or a corresponding probability flow ODE), in which a separate marginal distribution $p_\theta(z_0)$ is defined at t=0. Consequently, the learned approximate score $\nabla_{z_t} \log p_\theta(z_t)$ is not necessarily the same as the score obtained when diffusing $p_\theta(z_0)$ Thus, during training of the prior represented by SGM 212, the expression in Equation 18 corresponds to an upper bound on the cross entropy between q($z_0$|x) and $p_\theta$($z_0$) defined by the generative reverse-time SDE.

As discussed above, the hierarchical prior represented by latent variable hierarchy 204 can be converted into a standard Normal $\mathcal{N}$ ($z_0$; 0, I) using a change of variables. Within a single-dimensional latent space, this standard Normal prior at time t can be represented by a geometric mixture p($z_t$)∝ $\mathcal{N}$ ($z_t$; 0, 1)$^{1-\alpha}$p'$_\theta$($z_t$)$^\alpha$, where p'$_\theta$($z_t$) is a trainable SGM 212 prior and α∈[0,1] is a learnable scalar mixing coefficient. This formulation allows training engine 122 to pretrain encoder 202 and decoder 206 of VAE 200 with α=0, which corresponds to training VAE 200 with a standard Normal prior. This pretraining of encoder 202 and decoder 206 brings the distribution of latent variables close to $\mathcal{N}$ ($z_0$; 0,1). This "mixed" score function parameterization also allows SGM 212 to learn a simpler distribution that models the mismatch between the distribution of latent variables and the standard Normal distribution in a subsequent end-to-end training stage. Further, the score function for the geometric mixture described above is of the form $\nabla_{z_t}$ log p($z_t$)=−(1−α)$z_t$+α$\nabla_{z_t}$ log p'$_\theta$($z_t$). When the score function is dominated by the linear term of −(1−α)$z_t$, the reverse SDE can be solved faster, as the drift of the reverse SDE is dominated by this linear term.

For a multivariate latent space, training engine 122 obtains diffused samples at time t by sampling $z_t$∼q($z_t$|$z_0$) with $z_t$=$\mu_t$($z_0$)+$\sigma_t$ϵ, where ϵ∼$\mathcal{N}$ (ϵ; 0, I). Because $\nabla_{z_t}$ log q($z_t$|$z_0$)=−ϵ/$\sigma_t$, the score function can be parameterized by $\nabla_{z_t}$ log p($z_t$):=−$\epsilon_\theta$($z_t$, t)/$\sigma_t$, where $\epsilon_\theta$($z_t$, t):=$\sigma_t$(1−α)⊙$z_t$+α⊙ϵ'$_\theta$($z_t$, t) is defined by a mixed score parameterization that is applied element-wise to components of the score. This can be used to simplify the cross-entropy expression to the following:

$$CE(q_\phi(z_0 \mid x) \parallel p_\theta(z_0)) = \qquad (19)$$

$$\mathbb{E}_{t\sim\mathcal{U}[0,1]}\left[\frac{w(t)}{2}\mathbb{E}_{q_\phi(z_t,z_0\mid x),\epsilon}\left[\|\epsilon - \epsilon_\theta(z_t, t)\|_2^2\right]\right] + \frac{D}{2}\log(2\pi e\sigma_0^2)$$

where w(t)=$g^2$(t)$\sigma_t^2$ is a time-dependent weighting scalar.

In one or more embodiments, training engine 122 varies the loss weighting term w(t) in one or more objectives 232-236 used to train encoder 202, decoder 206, and/or SGM 212. More specifically, training engine 122 uses the above loss weighting of $w_{ll}$(t)=$g^2$(t)/$\sigma_t^2$ to train encoder 202, decoder 206, and optionally SGM 212 with maximum likelihood. This maximum-likelihood loss weighting ensures that encoder 202 $q_\phi$($z_0$|x) is brought closer to the true posterior p($z_0$|x). Alternatively, training engine 122 can alternatively use a different loss weighting of $w_{un}$(t)=1 during SGM training 222 to drop w(t), which produces higher quality samples at a small cost in likelihood. Training engine 122 can also, or instead, use a third loss weighting of $w_{re}$(t)=$g^2$(t) during SGM training 222 to have a similar effect on the sample quality as $w_{un}$(t)=1. As described in further detail below, this third weighting of w(t)=$g^2$(t) can be used to define a simpler variance reduction scheme associated with sampling the time variable t during training of SGM 212.

With the three different loss weightings described above, training engine 122 can train encoder 202, decoder 206, and SGM 212 using the following representations of objectives 232-236 (with t∼ $\mathcal{U}$ [0,1] and ϵ∼$\mathcal{N}$ (ϵ; 0, I)):

$$\min_{\phi,\psi}\mathbb{E}_{q_\phi(z_0\mid x)}\left[-\log p_\psi(x \mid z_o)\right] + \mathbb{E}_{q_\phi(z_0\mid x)}\left[-\log q_\phi(z_o \mid x)\right] + \qquad (20)$$

$$\mathbb{E}_{t,\epsilon,q(z_t\mid z_0),q_\phi(z_0\mid x)}\left[\frac{w_{11}(t)}{2}\|\epsilon - \epsilon_\theta(z_t, t)\|_2^2\right]$$

$$\min_\theta \mathbb{E}_{t,\epsilon,q(z_t\mid z_0),q_\phi(z_0\mid x)}\left[\frac{w_{11/un/re}(t)}{2}\|\epsilon - \epsilon_\theta(z_t, t)\|_2^2\right] \text{ with } q(z_t \mid z_0) = \qquad (21)$$

$$\mathcal{N}(z_t; \mu_t(z_0), \sigma_t^2 I)$$

More specifically, training engine 122 uses Equation 20 to train the parameters {ϕ, ψ} of encoder 202 and decoder 206 using the variational bound $\mathcal{L}$ (x, ϕ, θ, ψ) from Equation 17 and the maximum-likelihood loss weighting. Training engine 122 uses Equation 21 to train the parameters θ of SGM 212 with the cross-entropy term and one of the three (maximum-likelihood, unweighted, or reweighted) loss weightings.

Those skilled in the art will appreciate that the objectives in Equations 20 and 21 involve sampling of the time variable t, which has high variance. More specifically, the variance of the cross entropy in a mini-batch update depends on the variance of CE(q($z_0$)∥p($z_0$)), where q($z_0$):=$\mathbb{E}_{p_{data}(x)}$[q($z_0$|x)] is the aggregate posterior (i.e., the distribution of latent variables) and $p_{data}$ is n the data distribution. This variance is a result of a mini-batch estimation of $\mathbb{E}_{p_{data}(x)}\mathcal{L}$ (x, ϕ, θ, ψ)]. For the cross-entropy term in $\mathcal{L}$ (x, ϕ, θ, ψ), $\mathbb{E}_{p_{data}(x)}$ [CE(q($z_0$|x)∥p($z_0$))]=CE(q($z_0$)∥p($z_0$)). This value of CE(q($z_0$) ∥p($z_0$)) can be derived analytically and used to reduce the variance of sample-based estimates of the cross-entropy term for all three loss weightings associated w(t), assuming q($z_0$)=p($z_0$)=$\mathcal{N}$ f($z_0$; 0, I). The reduced variance provides for more stable gradients and better convergence during training of SGM 212, encoder 202, and/or decoder 206.

In some embodiments, training engine 122 reduces this variance for all three loss weightings using a variance-preserving SDE (VPSDE), which is defined by dz=−½β(t)z dt+√β(t)dw, where β(t)=$\beta_0$+($\beta_1$−$\alpha_0$)t linearly interpolates in [$\beta_0$,$\beta_1$]. The marginal distribution of latent variables is denoted by q($z_0$):=$\mathbb{E}_{p_{data}(x)}$[q($z_o$|x)], and q($z_0$)=p($z_0$)=$\mathcal{N}$ ($z_0$; 0, I) is assumed. This assumption is valid because pretraining encoder 202 and decoder 206 with a $\mathcal{N}$ ($z_0$; 0, I) prior brings q($z_0$) close to $\mathcal{N}$ ($z_0$; 0, I), and the prior represented by SGM 212 is often dominated by the fixed Normal mixture component. The cross-entropy term for the VPSDE can be expressed as the following:

$$CE(q(z_0) \| p(z_0)) = \frac{D(1-\epsilon)}{2}\mathbb{E}_{t\sim\mathcal{U}[\epsilon,1]}\left[\frac{1}{\sigma_t^2}\frac{d\sigma_t^2}{dt}\right] + const.$$

In one or more embodiments, training engine 122 performs variance reduction for the likelihood loss weighting $w_{ll}$(t)=g(t)$^2$/$\sigma_t^2$ using a geometric VPSDE. This geometric VPSDE is defined by $$\beta(t) = \log\left(\frac{\sigma_{max}^2}{\sigma_{min}^2}\right)\frac{\sigma_t^2}{1-\sigma_t^2}$$

with geometric variance $\sigma_t^2 = \sigma_{min}^2(\sigma_{max}^2/\sigma_{min}^2)^t$. The geometric VPSDE is designed so that $$\frac{1}{\sigma_t^2}\frac{d\sigma_t^2}{dt}$$

is constant tor $t \in [0,1]$, which reduces the variance of the Monte-Carlo estimation of the expectation in the cross-entropy term. $\sigma_{min}^2$ and $\sigma_{max}^2$ are hyperparameters of the SDE, with $0 < \sigma_{min}^2 < \sigma_{max}^2 < 1$. For small $\sigma_{min}^2$ and $\sigma_{max}^2$ close to 1, all inputs diffuse closely toward the standard Normal prior at $t=1$. Additionally, because $$\frac{\partial}{\partial t}$$

$CE(q(z_t)||p(z_t)) = $const. for Normal input data, data is encoded as "continuously" as possible throughout the diffusion process.

Training engine 122 can also, or instead, keep $\beta(t)$ and $\sigma_t^2$ unchanged for a linear variance-preserving SDE and use an importance sampling (IS) technique to reduce the variance of the cross-entropy estimate. The IS technique assumes a Normal data distribution, derives a proposal distribution that minimizes the variance of the estimation of the expectation in the cross-entropy term, and performs sampling of the proposal distribution using inverse transform sampling. This IS technique can be used with any VPSDE with arbitrary $\beta(t)$ and all three loss weightings.

In particular, IS can be used to rewrite the expectation in Equation 22 as:

$$\mathbb{E}_{t \sim \mathcal{U}[\epsilon,1]}\left[\frac{1}{\sigma_t^2}\frac{d\sigma_t^2}{dt}\right] = \mathbb{E}_{t \sim r(t)}\left[\frac{1}{r(t)}\frac{1}{\sigma_t^2}\frac{d\sigma_t^2}{dt}\right] \quad (23)$$

where $r(t)$ is a proposal distribution. According to IS theory, $$r(t) \propto \frac{d}{dt}$$

$\log \sigma_t^2$ has the smallest variance. Therefore, the objective can be evaluated using a sample from $r(t)$ and IS.

In some embodiments, $r(t)$ for the maximum-likelihood loss weighting $w_{ll}(t) = g(t)^2/\sigma_t^2$ includes the following probability density function (PDF):

$$r(t) = \frac{1}{\log \sigma_1^2 - \log \sigma_\epsilon^2}\frac{1}{\sigma_t^2}\frac{d\sigma_t^2}{dt} = \frac{\beta(t)(1-\sigma_t^2)}{(\log \sigma_1^2 - \log \sigma_\epsilon^2)\sigma_t^2} \quad (24)$$

Inverse transform sampling of the proposal distribution can be derived from the inverse cumulative distribution function (CDF):

$$R(t) = \frac{\log \frac{\sigma_t^2}{\sigma_\epsilon^2}}{\log \frac{\sigma_1^2}{\sigma_\epsilon^2}} = \rho \Rightarrow \frac{\sigma_t^2}{\sigma_\epsilon^2} = \left(\frac{\sigma_1^2}{\sigma_\epsilon^2}\right)^\rho \Rightarrow t = \text{var}^{-1}\left((\sigma_1^2)^\rho (\sigma_0^2)^{1-\rho}\right) \quad (25)$$

where $\text{var}^{-1}$ is the inverse of $\sigma_t^2$ and $\rho \sim \mathcal{U}[0,1]$. An importance weighted objective corresponding to the cross-entropy term includes the following (ignoring the constants):

$$\frac{1}{2}\int_\epsilon^1 \frac{\beta(t)}{\sigma_t^2}\mathbb{E}_{z_0,\epsilon}[\|\epsilon - \epsilon_\theta(z_t, t)\|_2^2]dt = \quad (26)$$
$$\frac{1}{2}\mathbb{E}_{t \sim r(t)}\left[\frac{(\log \sigma_1^2 - \log \sigma_\epsilon^2)}{(1-\sigma_t^2)}\mathbb{E}_{z_0,\epsilon}\|\epsilon - \epsilon_\theta(z_t, t)\|_2^2\right]$$

For the unweighted loss weighting $w_{un}(t) = 1$ with $p(z_0) = \mathcal{N}(z_0; 0, I)$ and $q(z_0) = \mathcal{N}(z_0, 0, (1-\sigma_0^2)I)$, the unweighted objective includes the following:

$$\int_\epsilon^1 \mathbb{E}_{z_0,\epsilon}[\|\epsilon - \epsilon_\theta(z_t, t)\|_2^2]dt = \frac{D(1-\epsilon)}{2}\mathbb{E}_{t \sim r(t)}\left[\frac{1-\sigma_t^2}{r(t)}\right] \quad (27)$$

with a proposal distribution $r(t) \propto 1 - \sigma_t^2$. In a VPSDE with linear $\beta(t) = \beta_0 + (\beta_1 - \beta_0)t$:

$$1 - \sigma_t^2 = (1-\sigma_0^2)e^{-\int_0^t \beta(s)ds} = (1-\sigma_0^2)e^{-\beta_0 t - (\beta_1-\beta_0)\frac{t^2}{2}} \quad (28)$$

Hence, the normalization constant of $r(t)$ is:

$$\tilde{R} = \int_\epsilon^1 (1-\sigma_0^2)e^{-\beta_0 t - (\beta_1-\beta_0)\frac{t^2}{2}}dt = (1-\sigma_0^2)e^{\frac{1}{2}\frac{\beta_0}{\beta_1-\beta_0}}\sqrt{\frac{\pi}{2(\beta_1-\beta_0)}} \quad (29)$$
$$\left[\text{erf}\left(\sqrt{\frac{\beta_1-\beta_0}{2}}\left[1 + \frac{\beta_0}{\beta_1-\beta_0}\right]\right) - \text{erf}\left(\sqrt{\frac{\beta_1-\beta_0}{2}}\left[\epsilon + \frac{\beta_0}{\beta_1-\beta_0}\right]\right)\right]$$

where $(1-\sigma_0^2)e^{\frac{1}{2}\frac{\beta_0}{\beta_1-\beta_0}}\sqrt{\frac{\pi}{2(\beta_1-\beta_0)}} := A_{\tilde{R}}$.

The CDF of $r(t)$ includes the following:

$$R(t) = \quad (30)$$
$$\frac{A_{\tilde{R}}}{\tilde{R}}\left[\text{erf}\left(\sqrt{\frac{\beta_1-\beta_0}{2}}\left[t + \frac{\beta_0}{\beta_1-\beta_0}\right]\right) - \text{erf}\left(\sqrt{\frac{\beta_1-\beta_0}{2}}\left[\epsilon + \frac{\beta_0}{\beta_1-\beta_0}\right]\right)\right]-$$

Solving $\rho = R(t)$ for $t$ results in the following:

$$t = \sqrt{\frac{2}{\beta_1-\beta_0}}\text{erfinv}\left(\frac{\rho\tilde{R}}{A_{\tilde{R}}} + \text{erf}\left(\sqrt{\frac{\beta_1-\beta_0}{2}}\left[\epsilon + \frac{\beta_0}{\beta_1-\beta_0}\right]\right)\right) - \frac{\beta_0}{\beta_1-\beta_0} \quad (31)$$

An importance weighted objective corresponding to the cross-entropy term includes the following (ignoring the constants):

$$\int_\epsilon^1 \mathbb{E}_{z_0,\epsilon}[\|\epsilon - \epsilon_\theta(z_t, t)\|_2^2]dt = \mathbb{E}_{t \sim r(t)}\left[\frac{\tilde{R}}{(1-\sigma_t^2)}\mathbb{E}_{z_0,\epsilon}\|\epsilon - \epsilon_\theta(z_t, t)\|_2^2\right] \quad (32)$$

For the reweighted loss weighting $w_{re}(t) = g(t)^2$, $\sigma_t^2$ is dropped from the cross-entropy objective but $g^2(t) = \beta(t)$ is kept. For $(z_0) = \mathcal{N}(z_o; 0, I)$ and $q(z_0) = \mathcal{N}(z_0, 0, (1-\sigma_0^2))$, the unweighted objective includes the following:

$$\int_{\epsilon}^{1} \beta(t) \mathbb{E}_{z_0,\epsilon} \left[ \|\epsilon - \epsilon_\theta(z_t, t)\|_2^2 \right] dt = \tag{33}$$

$$\frac{D(1-\epsilon)}{2} \mathbb{E}_{t \sim \mathcal{U}[\epsilon,1]} \left[ \frac{d\sigma_t^2}{dt} \right] = \frac{D(1-\epsilon)}{2} \mathbb{E}_{t \sim r(t)} \left[ \frac{\frac{d\sigma_t^2}{dt}}{r(t)} \right]$$

with proposal distribution $$r(t) \propto \frac{d\sigma_t^2}{dt} = \beta(t)(1 - \sigma_t^2).$$

The proposal r(t), the corresponding cumulative distribution function (CDF) R(t) and inverse CDF $R^{-1}$(t) for the reweighted loss weighting include the following:

$$r(t) = \frac{\beta(t)(1 - \sigma_t^2)}{\sigma_1^2 - \sigma_\epsilon^2}, \ R(t) = \frac{\sigma_t^2 - \sigma_\epsilon^2}{\sigma_1^2 - \sigma_\epsilon^2}, \tag{34}$$

$$t = R^{-1}(\rho) = \text{var}^{-1}((1-\rho)\sigma_\epsilon^2 + \rho\sigma_1^2)$$

Usually, $\sigma_\epsilon^2 \geq 0$ and $\sigma_1^2 \leq 1$. In this case, the inverse CDF can be thought of as $R^{-1}(\rho) = \text{var}^{-1}(\rho)$.

An importance weighted objective corresponding to the cross-entropy term includes the following (ignoring the constants):

$$\frac{1}{2} \int_{\epsilon}^{1} \beta(t) \mathbb{E}_{z_0,\epsilon} \left[ \|\epsilon - \epsilon_\theta(z_t, t)\|_2^2 \right] dt = \tag{35}$$

$$\frac{1}{2} \mathbb{E}_{t \sim r(t)} \left[ \frac{(\sigma_1^2 - \sigma_\epsilon^2)}{(1 - \sigma_t^2)} \mathbb{E}_{z_0,\epsilon} \|\epsilon - \epsilon_\theta(z_t, t)\|_2^2 \right]$$

In one or more embodiments, training engine 122 is configured to use one of multiple training procedures to train encoder 202, decoder 206, and/or SGM 212. A first training procedure involves likelihood training with IS, in which the prior represented by SGM 212 and encoder 202 share the same weighted likelihood objective and are not updated separately. The first training procedure is illustrated using the following steps:

Input: data x, parameters $\{\theta, \phi, \psi\}$
Draw $z_0 \sim q_\phi(z_0|x)$ using encoder.
Draw $t \sim r_{ll}(t)$ with IS distribution for maximum likelihood loss weighting.
Calculate $\mu_t(z_0)$ and $\sigma_t^2$ according to SDE.
Draw $z_t \sim q(z_t|z_0)$ using $z_t = \mu_t(z_0) + \sigma_t^2 \epsilon$, where $\epsilon \sim \mathcal{N}(\epsilon; 0, I)$.
Calculate score $\epsilon_\theta(z_t, t) := \sigma_t(1-\alpha) \odot z_t + \alpha \odot \epsilon'_\theta(z_t, t)$.

Calculate cross entropy $CE(q_\phi(z_0 \mid x) \mid p_\theta(z_0)) \approx$ $$\frac{1}{r_{11}(t)} \frac{w_{11}(t)}{2} \|\epsilon - \epsilon_\theta(z_t, t)\|_2^2.$$

Calculate objective $\mathcal{L}(x, \phi, \theta, \psi) = -\log p_\psi(x|z_o) + \log q_\phi(z_0|x) + CE(q_\phi(z_0|x)|p_\theta(z_0))$.
Update all parameters $\{\theta, \phi, \psi\}$ by minimizing $\mathcal{L}(x, \phi, \theta, \psi)$.

In the first training procedure, training engine 122 trains encoder 202, decoder 206, and SGM 212 in an end-to-end fashion using the same objective with three terms. The first term of $\log p_\psi(x|z_o)$ is a reconstruction term that is used to update the parameters $\psi$ of decoder 206, the second term of $\log q_\phi(z_0|x)$ is a negative encoder entropy term that is used to update the parameters $\phi$ of encoder 202, and the third term of $CE(q_\phi(z_0|x)|p_\theta(z_0))$ includes the maximum-likelihood loss weighting and is used to update the parameters $\phi$ of encoder 202 and the parameters $\theta$ of SGM 212.

A second training procedure involves unweighted or reweighted training with separate IS of t for two different loss weightings. The second training procedure is illustrated using the following steps:

Input: data x, parameters $\{\theta, \phi, \psi\}$
Draw $z_0 \sim q_\phi(z_0|x)$ using encoder.
Update SGM prior:
  Draw $t \sim r_{un/re}(t)$ with IS distribution for unweighted or reweighted objective.
  Calculate $\mu_t(z_0)$ and $\sigma_t^2$ according to SDE.
  Draw $z_t \sim q(z_t|z_0)$ using $z_t = \mu_t(z_0) + \sigma_t^2 \epsilon$, where $\epsilon \sim \mathcal{N}(\epsilon; 0, I)$.
  Calculate score $\epsilon_\theta(z_t, t) := \sigma_t(1-\alpha) \odot z_t + \alpha \odot \epsilon'_\theta(z_t, t)$.

Calculate objective $\mathcal{L}(\theta) \approx \frac{1}{r_{un/re}(t)} \frac{w_{un/re}(t)}{2} \|\epsilon - \epsilon_\theta(z_t, t)\|_2^2.$ Update SGM prior parameters by minimizing $\mathcal{L}(\theta)$.
Update VAE encoder and decoder with new t sample:
  Draw $t \sim r_{ll}(t)$ with IS distribution for maximum likelihood loss weighting.
  Calculate $\mu_t(z_0)$ and $\sigma_t^2$ according to SDE.
  Draw $z_t \sim q(z_t|z_0)$ using $z_t = \mu_t(z_0) + \sigma_t^2 \epsilon$, where $\epsilon \sim \mathcal{N}(\epsilon; 0, I)$.
  Calculate score $\epsilon_\theta(z_t, t) := \sigma_t(1-\alpha) \odot z_t + \alpha \odot \epsilon'_\theta(z_t, t)$.

Calculate cross entropy $CE(q_\phi(z_0 \mid x) \mid p_\theta(z_0)) \approx$ $$\frac{1}{r_{11}(t)} \frac{w_{11}(t)}{2} \|\epsilon - \epsilon_\theta(z_t, t)\|_2^2.$$

Calculate objective $\mathcal{L}(x, \phi, \psi) = -\log p_\psi(x \mid z_o) + \log q_\phi(z_0 \mid x) + CE(q_\phi(z_0 \mid x) \mid p_\theta(z_0))$.

Update VAE parameters $\{\phi, \psi\}$ by minimizing $\mathcal{L}(x, \phi, \psi)$, In the second training procedure, training engine 122 draws a first batch of t from a first IS distribution for an unweighted or reweighted loss weighting. Training engine 122 updates the parameters $\theta$ of the prior represented by SGM 212 based on a first objective that includes a cross-entropy term with the same unweighted or reweighted loss weighting and the first IS distribution. Training engine 122 separately samples a second batch of t from a second IS distribution for a maximum-likelihood loss weighting that is required for training encoder 202. Training engine 122 updates the parameters $\{\phi, \psi\}$ of encoder 202 and decoder 206 based on a second objective that includes a reconstruction term associated with decoder 206, a negative entropy term associated with encoder 202, and a cross-entropy term that includes the maximum-likelihood loss weighting and the second IS distribution.

A third training procedure involves unweighted or reweighted training with IS of t for an objective associated with SGM training 222 and reweighting for the objective associated with encoder training 220. The third training procedure is illustrated using the following steps:

Input: data x, parameters $\{\theta, \phi, \psi\}$

Draw $z_0 \sim q_\phi(z_0|x)$ using encoder.

Draw $t \sim r_{un/re}(t)$ with IS distribution for unweighted or reweighted objective.

Calculate $\mu_t(z_0)$ and at according to SDE.

Draw $z_t \sim (z_t|z_0)$ using $z_t = \mu_t(z_0) + \sigma_t^2 \epsilon$, where $\epsilon \mathcal{N}(\epsilon; 0, I)$.

Calculate score $\epsilon_\theta(z_t, t) := \sigma_t(1-\alpha) \odot z_t + \alpha \odot \epsilon'_\theta(z_k, t)$.

Compute $\mathcal{L}_{DSM} := \|\epsilon - \epsilon_\theta(z_t, t)\|_2^2$.

Compute SGM prior loss:

$$\text{Calculate objective } \mathcal{L}(\theta) \approx \frac{1}{r_{un/re}(t)} \frac{w_{un/re}(t)}{2} \mathcal{L}_{DSM}.$$

Compute VAE encoder and decoder loss with the same t sample:

$$\text{Calculate cross entropy } CE(q_\phi(z_0 \mid x) \mid p_\theta(z_0)) \approx \frac{1}{r_{un/re}(t)} \frac{w_{11}(t)}{2} \mathcal{L}_{DSM}.$$

Calculate objective $\mathcal{L}(x, \phi, \psi) = -\log p_\psi(x \mid z_o) + \log q_\phi(z_0 \mid x) + CE(q_\phi(z_0 \mid x) \mid p_\theta(z_0))$.

Update all parameters:

Update SGM prior parameters by minimizing $\mathcal{L}(\theta)$.

Update VAE parameters $\{\phi, \psi\}$ by minimizing $\mathcal{L}(x, \phi, \psi)$ In the third training procedure, training engine 122 samples a batch of t from an IS distribution for an unweighted or reweighted loss weighting. Training engine 122 uses the batch to calculate a first objective that includes a denoising score matching loss $\mathcal{L}_{DSM}$ and the same unweighted or reweighted loss weighting. Training engine 122 uses the same batch of t to calculate a second objective that includes the denoising score matching loss, the IS distribution, the maximum-likelihood loss weighting. Training engine 122 updates the parameters θ of the prior represented by SGM 212 based on the first objective. Training engine 122 also updates the parameters $\{\phi, \psi\}$ of encoder 202 and decoder 206 based on the second objective. Training engine 122 thus trains encoder 202 using an IS distribution that is tailored to unweighted or reweighted training for the first SGM 212 objective and is not tailored to the maximum-likelihood loss weighting. This allows training engine 122 to avoid drawing a second batch of t for training encoder 202 and use the same denoising score matching loss $\mathcal{L}_{DSM}$ in both objectives, thereby reducing the computational overhead of the training process.

After training of encoder 202, decoder 206, and SGM 212 is complete, execution engine 124 uses decoder 206 and SGM 252 to produce generative output 250 that is not found in the set of training data 208. More specifically, execution engine 124 generates base distribution samples 246 from the base distribution associated with SGM 212. Execution engine 124 uses SGM 212 to convert base distribution samples 246 into prior samples 248 in the latent space associated with latent variable hierarchy 204. Execution engine 124 then uses decoder 206 to convert prior samples 248 into generative output 250.

For example, execution engine 124 could generate base distribution samples 246 from a standard Normal distribution $z_1 \sim \mathcal{N}(z_1; 0, I)$. Execution engine 124 could use a black-box differential equation solver to convert base distribution samples 246 into prior samples 248 $z_0$ by running the reverse-time SDE represented by Equation 5 or the probability flow ODE represented by Equation 6. Execution engine 124 could also, or instead, use an ancestral sampling technique to generate a reverse Markov chain, starting with samples starting from base distribution samples 246 $z_1$ and ending with prior samples 248 $z_0$. During each time step associated with the reverse-time SDE, probability flow ODE, and/or ancestral sampling technique, execution engine 124 could perform iterative denoising of base distribution samples 246 $z_1$ using a score that is estimated by SGM 212. Execution engine 124 could then use decoder 206 $p_\psi(x|z_o)$ to map prior samples 248 $z_0$ to a data likelihood and generate data point x that corresponds to generative output 250 by sampling from the data likelihood generated by decoder 206.

Figure 3B:
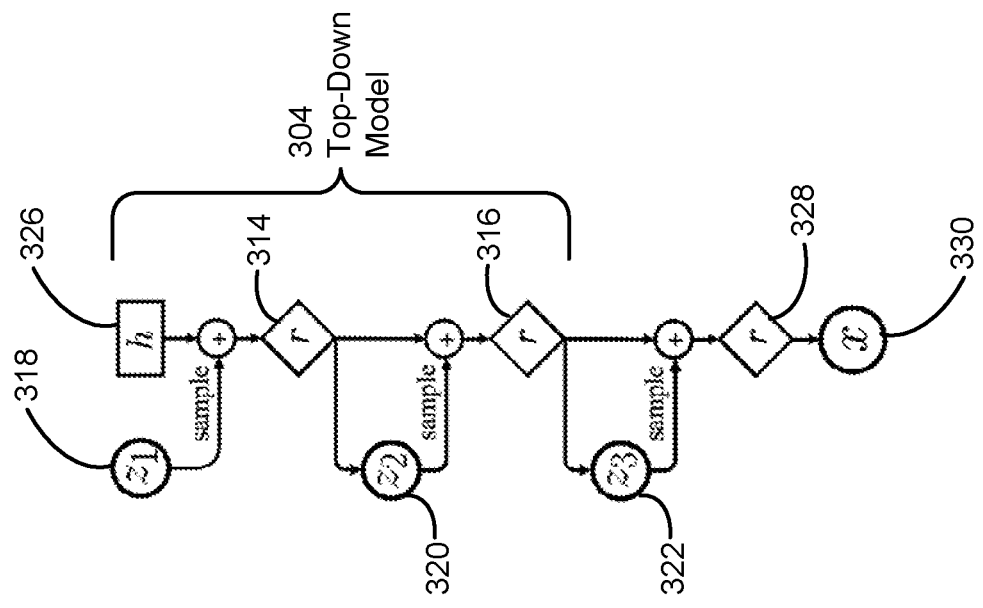
FIG. 3B illustrates an exemplar architecture for a generative model included in a hierarchical version of the VAE of FIG. 2, according to various embodiments.
Figure 3A:
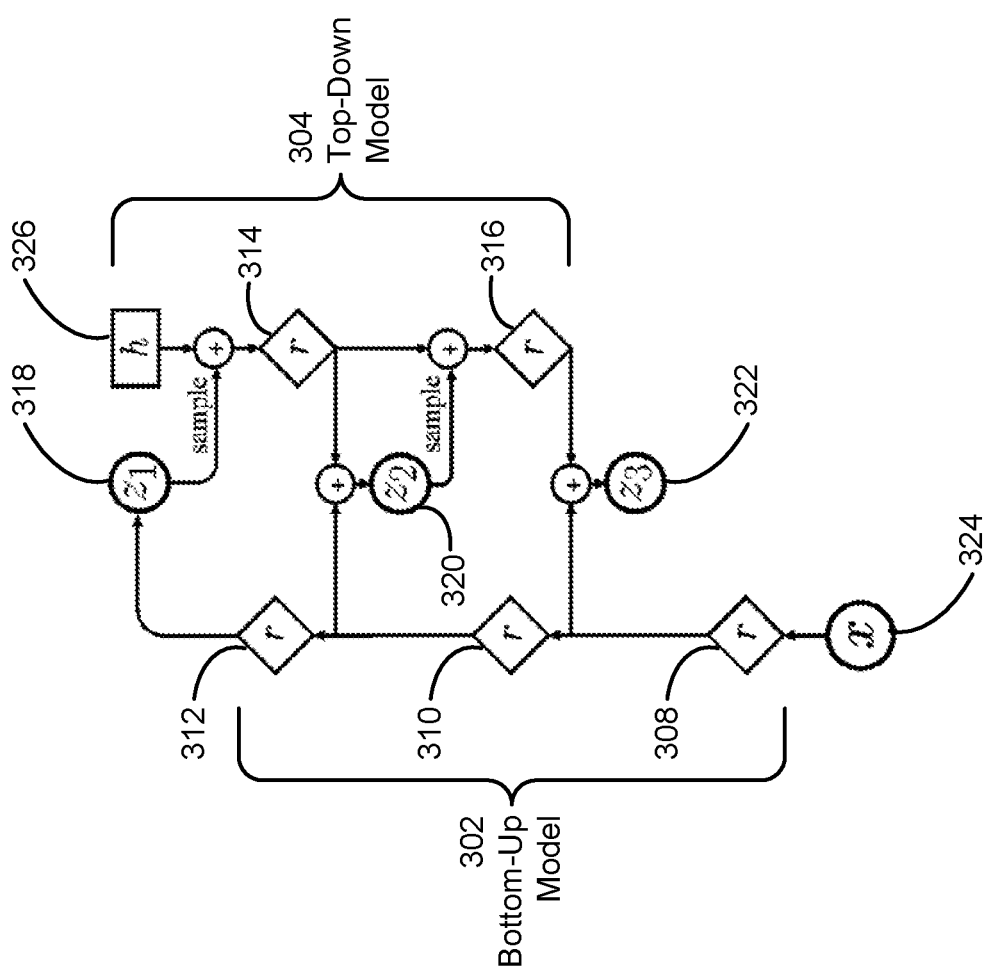
FIG. 3A illustrates an exemplar architecture for the encoder included in a hierarchical version of the VAE of FIG. 2, according to various embodiments.

FIG. 3A illustrates an exemplar architecture for encoder 202 included in a hierarchical version of VAE 200 of FIG. 2, according to various embodiments. As shown, the example architecture forms a bidirectional inference model that includes a bottom-up model 302 and a top-down model 304.

Bottom-up model 302 includes a number of residual networks 308-312, and top-down model 304 includes a number of additional residual networks 314-316 and a trainable parameter 326. Each of residual networks 308-316 includes one or more residual cells, which are described in further detail below with respect to FIGS. 4A and 4B.

Residual networks 308-312 in bottom-up model 302 deterministically extract features from an input 324 (e.g., an image) to infer the latent variables in the approximate posterior (e.g., q(z|x) in the probability model for VAE 200). Components of top-down model 304 are used to generate the parameters of each conditional distribution in latent variable hierarchy 204. After latent variables are sampled from a given group in latent variable hierarchy 204, the samples are combined with feature maps from bottom-up model 302 and passed as input to the next group.

More specifically, a given data input 324 is sequentially processed by residual networks 308, 310, and 312 in bottom-up model 302. Residual network 308 generates a first feature map from input 324, residual network 310 generates a second feature map from the first feature map, and residual network 312 generates a third feature map from the second feature map. The third feature map is used to generate the parameters of a first group 318 of latent variables in latent variable hierarchy 204, and a sample is taken from group 318 and combined (e.g., summed) with parameter 326 to produce input to residual network 314 in top-down model 304. The output of residual network 314 in top-down model 304 is combined with the feature map produced by residual network 310 in bottom-up model 302 and used to generate the parameters of a second group 320 of latent variables in latent variable hierarchy 204. A sample is taken from group 320 and combined with output of residual network 314 to generate input into residual network 316. Finally, the output of residual network 316 in top-down model 304 is combined with the output of residual network 308 in bottom-up model 302 to generate parameters of a third group 322 of latent variables, and a sample may be taken from group 322 to produce a full set of latent variables representing input 324.

While the example architecture of FIG. 3A is illustrated with a latent variable hierarchy of three latent variable groups 318-322, those skilled in the art will appreciate that encoder 202 may utilize a different number of latent variable groups in the hierarchy, different numbers of latent variables in each group of the hierarchy, and/or varying numbers of residual cells in residual networks. For example, latent variable hierarchy 204 for an encoder that is trained using 28×28 pixel images of handwritten characters may include 15 groups of latent variables at two different "scales" (i.e., spatial dimensions) and one residual cell per group of latent variables. The first five groups have 4×4×20-dimensional latent variables (in the form of height×width×channel), and the next ten groups have 8×8×20-dimensional latent variables. In another example, latent variable hierarchy 204 for an encoder that is trained using 256×256 pixel images of human faces may include 36 groups of latent variables at five different scales and two residual cells per group of latent variables. The scales include spatial dimensions of 8×8×20, 16×16×20, 32×32×20, 64×64×20, and 128×128×20 and 4, 4, 4, 8, and 16 groups, respectively.

FIG. 3B illustrates an exemplar architecture for a generative model included in a hierarchical version of VAE 200 of FIG. 2, according to various embodiments. As shown, the generative model includes top-down model 304 from the exemplar encoder architecture of FIG. 3A, as well as an additional residual network 328 that implements decoder 206.

In the exemplar generative model architecture of FIG. 3B, the representation extracted by residual networks 314-316 of top-down model 304 is used to infer groups 318-322 of latent variables in the hierarchy. A sample from the last group 322 of latent variables is then combined with the output of residual network 316 and provided as input to residual network 328. In turn, residual network 328 generates a data output 330 that is a reconstruction of a corresponding input 324 into the encoder and/or a new data point sampled from the distribution of training data for VAE 200.

In some embodiments, top-down model 304 is used to learn a prior distribution of latent variables during training of VAE 200. The prior is then reused in the generative model and/or joint model 226 to sample from groups 318-322 of latent variables before some or all of the samples are converted by decoder 206 into generative output. This sharing of top-down model 304 between encoder 202 and the generative model reduces computational and/or resource overhead associated with learning a separate top-down model for the prior and using the separate top-down model in the generative model. Alternatively, VAE 200 may be structured so that encoder 202 uses a first top-down model to generate latent representations of training data 208 and the generative model uses a second, separate top-down model as prior 252.

As mentioned above, the prior distribution of latent variables can be generated by SGM 212, in lieu of or in addition to one or more instances of top-down model 304. Here, the diffusion process input $z_o$ can be constructed by concatenating the latent variable groups (e.g., groups 318-322) in the channel dimension. When the latent variable groups have multiple spatial resolutions, the smallest resolution groups can be fed into SGM 212, and the remaining groups can be assumed to have a standard Normal distribution.

In one or more embodiments, the architecture of SGM 212 is based on a noise conditional score network (NCSN) that parameterizes the score function used to iteratively convert between samples from a standard Normal distribution $z_1 \sim \mathcal{N}(z_1; 0, I)$ (e.g., base distribution samples 246 of FIG. 2A) and samples from the distribution of latent variables in latent variable hierarchy 204 (e.g., prior samples 248 of FIG. 2A). For example, SGM 212 could include an NCSN++ architecture that includes a series of residual network blocks. The NCSN++ architecture uses finite impulse response (FIR) upsampling and downsampling, rescales skip connections, employs BigGAN-type residual network blocks, processes each spatial resolution level using a number of residual network blocks (controlled by a hyperparameter) and a certain number of channels in convolutions (controlled by a different hyperparameter), and/or does not have a progressive growing architecture for output. The NCSN++ architecture is adapted to predict tensors based on the latent variable dimensions from VAE 200.

Figure 4A:
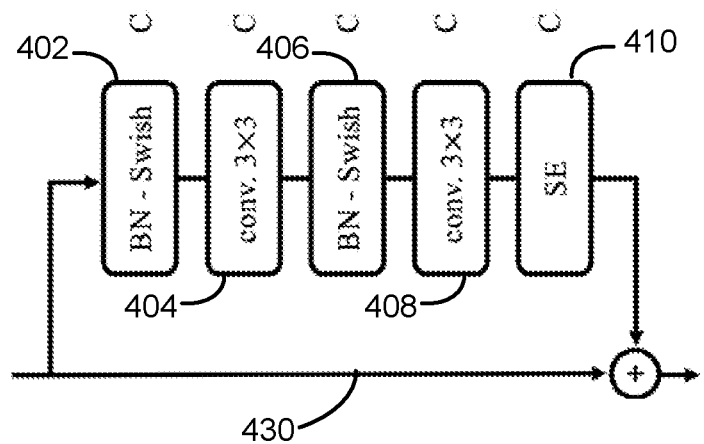
FIG. 4A illustrates an exemplar residual cell that resides within the encoder included in a hierarchical version of the VAE of FIG. 2, according to various embodiments.

FIG. 4A illustrates an exemplar residual cell that resides within the encoder included in a hierarchical version of the VAE of FIG. 2, according to various embodiments. More specifically, FIG. 4A shows a residual cell that is used by one or more residual networks 308-312 in bottom-up model 302 of FIG. 3A. As shown, the residual cell includes a number of blocks 402-410 and a residual link 430 that adds the input into the residual cell to the output of the residual cell.

Block 402 is a batch normalization block with a Swish activation function, block 404 is a 3×3 convolutional block, block 406 is a batch normalization block with a Swish activation function, block 408 is a 3×3 convolutional block, and block 410 is a squeeze and excitation block that performs channel-wise gating in the residual cell (e.g., a squeeze operation such as mean to obtain a single value for each channel, followed by an excitation operation that applies a non-linear transformation to the output of the squeeze operation to produce per-channel weights). In addition, the same number of channels is maintained across blocks 402-410. Unlike conventional residual cells with a convolution-batch normalization-activation ordering, the residual cell of FIG. 4A includes a batch normalization-activation-convolution ordering, which may improve the performance of bottom-up model 302 and/or encoder 202.

Figure 4B:
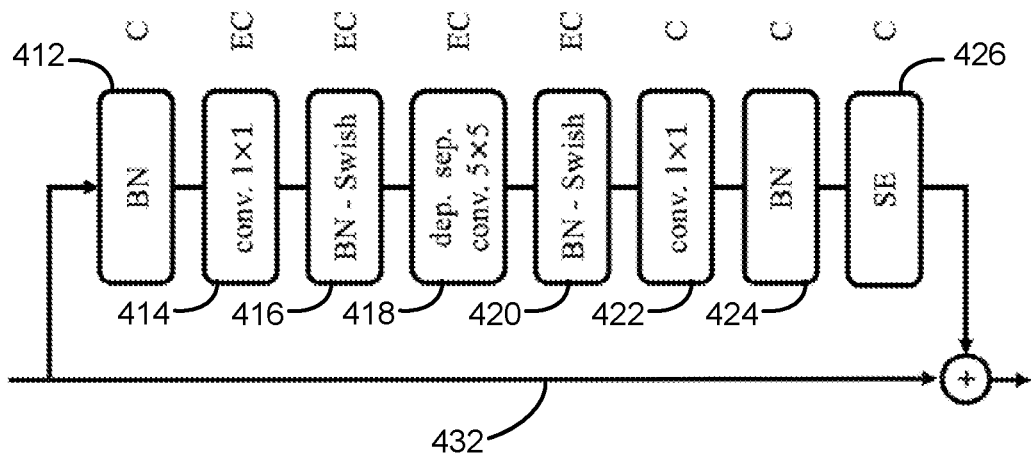
FIG. 4B illustrates an exemplar residual cell that resides within a generative portion of a hierarchical version of the VAE of FIG. 2, according to various embodiments.

FIG. 4B illustrates an exemplar residual cell that resides within a generative portion of a hierarchical version of the VAE of FIG. 2, according to various embodiments. More specifically, FIG. 4B shows a residual cell that is used by one or more residual networks 314-316 in top-down model 304 of FIGS. 3A and 3B. As shown, the residual cell includes a number of blocks 412-426 and a residual link 432 that adds the input into the residual cell to the output of the residual cell.

Block 412 is a batch normalization block, block 414 is a 1×1 convolutional block, block 416 is a batch normalization block with a Swish activation function, block 418 is a 5×5 depthwise separable convolutional block, block 420 is a batch normalization block with a Swish activation function, block 422 is a 1×1 convolutional block, block 424 is a batch normalization block, and block 426 is a squeeze and excitation block. Blocks 414-420 marked with "EC" indicate that the number of channels is expanded "E" times, while blocks marked with "C" include the original "C" number of channels. In particular, block 414 performs a 1×1 convolution that expands the number of channels to improve the expressivity of the depthwise separable convolutions performed by block 418, and block 422 performs a 1×1 convolution that maps back to "C" channels. At the same time, the depthwise separable convolution reduces parameter size and computational complexity over regular convolutions with increased kernel sizes without negatively impacting the performance of the generative model.

Moreover, the use of batch normalization with a Swish activation function in the residual cells of FIGS. 4A and 4B may improve the training of encoder 202 and/or the generative model over conventional residual cells or networks. For example, the combination of batch normalization and the Swish activation in the residual cell of FIG. 4A improves the performance of a VAE with 40 latent variable groups by about 5% over the use of weight normalization and an exponential linear unit activation in the same residual cell.

Although the operation of SGM 212 has been described above with respect to VAE 200, it will be appreciated that SGM 212 can be used with other types of generative models that include a prior distribution of latent variables in a latent space, a decoder that converts samples of the latent variables into samples in a data space of a training dataset, and a component or method that maps a sample in the training dataset to a sample in the latent space of the latent variables. In the context of VAE 200, the prior distribution is learned by SGM 212, encoder 202 converts samples of training data 208 in the data space into latent variables in the latent space associated with latent variable hierarchy 204, and decoder 206 is a neural network that is separate from encoder 202 and converts latent variable values from the latent space back into likelihoods in the data space.

A generative adversarial network (GAN) is another type of generative model that can be used with SGM 212. The prior distribution in the GAN can be represented by SGM 212, the decoder in the GAN is a generator network that converts a sample from the prior distribution into a sample in the data space of a training dataset, and the generator network can be numerically inverted to map samples in the training dataset to samples in the latent space of the latent variables.

A normalizing flow is another type of generative model that can be used with SGM 212. As with the GAN, the prior distribution in a normalizing flow can be learned by SGM 212. The decoder in a normalizing flow is represented by a neural network that relates the latent space to the data space using a deterministic and invertible transformation from observed variables in the data space to latent variables in the latent space. The inverse of the decoder in the normalizing flow can be used to map a sample in the training dataset to a sample in the latent space.

Figure 5:
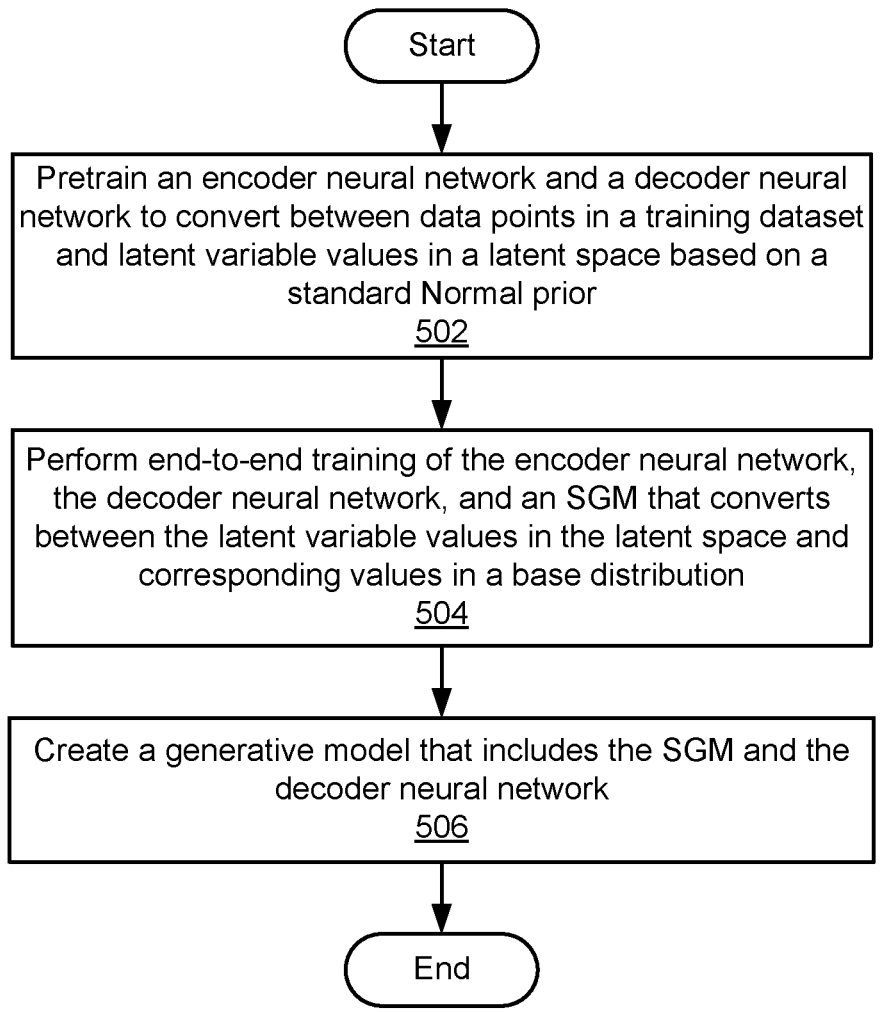
FIG. 5 illustrates a flow diagram of method steps for training a generative model, according to various embodiments.

FIG. 5 illustrates a flow diagram of method steps for training a generative model, according to various embodiments. Although the method steps are described in conjunction with the systems of FIGS. 1-4, persons skilled in the art will understand that any system configured to perform the method steps in any order falls within the scope of the present disclosure.

As shown, training engine 122 pretrains 502 an encoder neural network and a decoder neural network to convert between data points in a training dataset and latent variable values in a latent space based on a standard Normal prior. For example, training engine 122 could train an encoder neural network in a VAE to convert a set of training images (or other types of training data) into sets of latent variable values in a latent variable hierarchy (e.g., latent variable hierarchy 204 of FIG. 2A). Training engine 122 could also train a decoder neural network in the VAE to convert each set of latent variables back into a corresponding training image. Training engine 122 could further reparameterize a prior associated with the latent variable hierarchy into the standard Normal prior. During training of the VAE, training engine 122 could update the parameters of the encoder and decoder neural networks based on a variational lower bound on the log-likelihood of the data.

Next, training engine 122 performs 504 end-to-end training of the encoder neural network, the decoder neural network, and an SGM that converts between the latent variable values in the latent space and corresponding values in a base distribution. For example, the SGM could include a fixed forward diffusion process that converts each set of latent variable values into a corresponding set of values in the base distribution (e.g., a standard Normal distribution) by gradually adding noise to the latent variable values. The SGM could also include a neural network component that learns a score function that is used to reverse the forward diffusion process, thereby converting samples of noise from the base distribution into corresponding sets of latent variable values. The SGM would thus be trained to model the mismatch between the distribution of latent variable values and the base distribution.

More specifically, during operation 504, training engine 122 trains the encoder neural network, decoder neural network, and SGM based on one or more losses. The loss(es) include a reconstruction loss associated with a given data point in the training dataset and a reconstruction of the data point by the decoder neural network, a negative encoder entropy loss associated with the encoder neural network, and a cross entropy loss associated with a first distribution of latent variable values generated by the SGM and a second distribution of latent variable values generated by the encoder neural network based on the training dataset. Training engine 122 can train the encoder and decoder neural networks using a maximum-likelihood loss weighting associated with the cross-entropy loss. Training engine 122 can also train the SGM using the same maximum-likelihood loss weighting or a different (unweighted or reweighted) loss weighting. Training engine 122 can further use a geometric variance-preserving SDE and/or an IS technique that samples from a proposal distribution associated with a given loss weighting to reduce the variance of the cross-entropy loss.

Finally, training engine 122 creates 506 a generative model that includes the SGM and the decoder neural network. The generative model can then be used to generate new data points that are not found in the training dataset but that incorporate attributes extracted from the training dataset, as described in further detail below with respect to FIG. 6.

Figure 6:
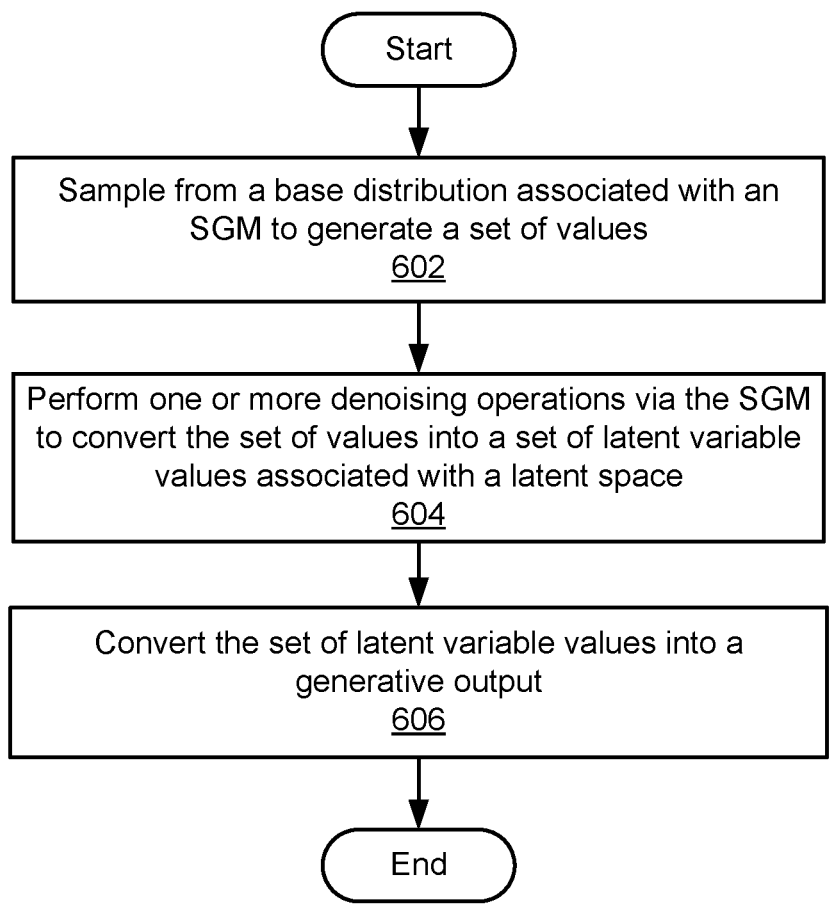
FIG. 6 illustrates a flow diagram of method steps for producing generative output, according to various embodiments.

FIG. 6 illustrates a flow diagram of method steps for producing generative output, according to various embodiments. Although the method steps are described in conjunction with the systems of FIGS. 1-4, persons skilled in the art will understand that any system configured to perform the method steps in any order falls within the scope of the present disclosure.

As shown, execution engine 124 samples 602 from a base distribution associated with an SGM to generate a set of values. For example, execution engine 124 could sample the set of values from a standard Normal distribution.

Next, execution engine 124 performs 604 one or more denoising operations via the SGM to convert the set of values into a set of latent variable values associated with a latent space. For example, execution engine 124 could convert the set of values into the set of latent variable values over a series of time steps. Each time step could involve the use of a reverse-time SDE, probability flow ODE, and/or ancestral sampling technique to remove noise from the set of values. The output of a given time step could be generated based on a score value outputted by the SGM for that time step.

Execution engine 124 then converts 606 the set of latent variable values into a generative output. For example, execution engine 124 could use a decoder neural network that was trained with the SGM to "decode" the latent variable values into a likelihood distribution. Execution engine 124 could then sample from the likelihood distribution to generate an image and/or another type of generative output.

Example Game Streaming System

Figure 7:
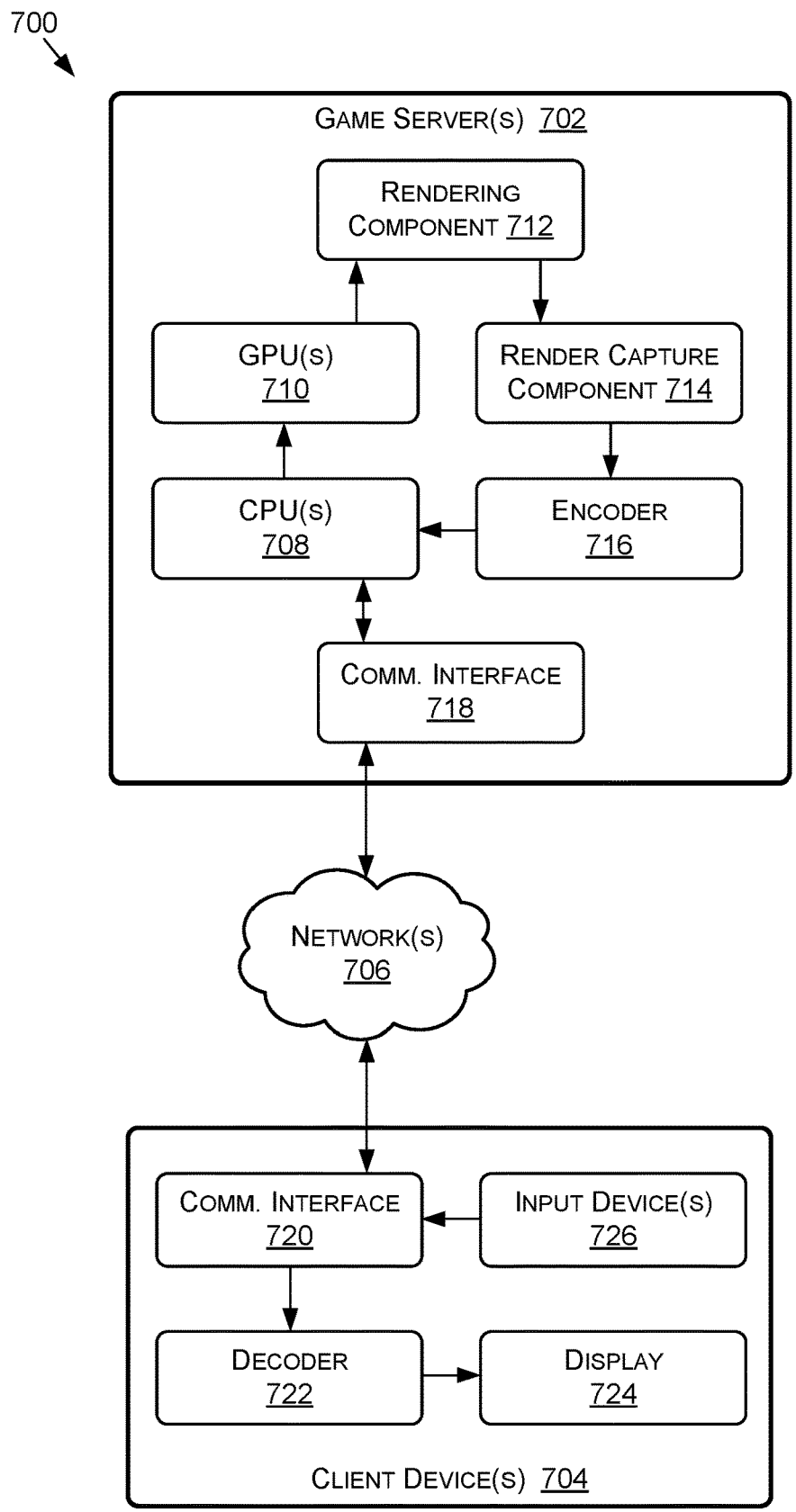
FIG. 7 illustrates a game streaming system configured to implement one or more aspects of the various embodiments.

FIG. 7 is an example system diagram for a game streaming system 700, according to various embodiments. FIG. 7 includes game server(s) 702 (which may include similar components, features, and/or functionality to the example computing device 100 of FIG. 1), client device(s) 704 (which may include similar components, features, and/or functionality to the example computing device 100 of FIG. 1), and network(s) 706 (which may be similar to the network(s) described herein). In some embodiments, system 700 may be implemented using a cloud computing system and/or distributed system.

In system 700, for a game session, client device(s) 704 may only receive input data in response to inputs to the input device(s), transmit the input data to game server(s) 702, receive encoded display data from game server(s) 702, and display the display data on display 724. As such, the more computationally intense computing and processing is offloaded to game server(s) 702 (e.g., rendering—in particular ray or path tracing—for graphical output of the game session is executed by the GPU(s) of game server(s) 702). In other words, the game session is streamed to client device(s) 704 from game server(s) 702, thereby reducing the requirements of client device(s) 704 for graphics processing and rendering.

For example, with respect to an instantiation of a game session, a client device 704 may be displaying a frame of the game session on the display 724 based on receiving the display data from game server(s) 702. Client device 704 may receive an input to one or more input device(s) 726 and generate input data in response. Client device 704 may transmit the input data to the game server(s) 702 via communication interface 720 and over network(s) 706 (e.g., the Internet), and game server(s) 702 may receive the input data via communication interface 718. CPU(s) 708 may receive the input data, process the input data, and transmit data to GPU(s) 710 that causes GPU(s) 710 to generate a rendering of the game session. For example, the input data may be representative of a movement of a character of the user in a game, firing a weapon, reloading, passing a ball, turning a vehicle, etc. Rendering component 712 may render the game session (e.g., representative of the result of the input data), and render capture component 714 may capture the rendering of the game session as display data (e.g., as image data capturing the rendered frame of the game session). The rendering of the game session may include ray- or path-traced lighting and/or shadow effects, computed using one or more parallel processing units—such as GPUs 710, which may further employ the use of one or more dedicated hardware accelerators or processing cores to perform ray or path-tracing techniques—of game server(s) 702. Encoder 716 may then encode the display data to generate encoded display data and the encoded display data may be transmitted to client device 704 over network(s) 706 via communication interface 718. Client device 704 may receive the encoded display data via communication interface 720, and decoder 722 may decode the encoded display data to generate the display data. Client device 704 may then display the display data via display 724.

In some embodiments, system 700 includes functionality to implement training engine 122 and/or execution engine 124 of FIGS. 1-2. For example, one or more components of game server 702 and/or client device(s) 704 could execute training engine 122 to train a VAE and/or another generative model that includes an encoder network, a prior network, and/or a decoder network based on a training dataset (e.g., a set of images or models of characters or objects in a game). The executed training engine 122 could also train an SGM that acts as a prior for the generative model and corrects for a mismatch between the distribution of latent variables learned by the generative model and a standard Normal distribution. One or more components of game server 702 and/or client device(s) 704 may then execute execution engine 124 to produce generative output (e.g., additional images or models of characters or objects that are not found in the training dataset) by sampling a set of values from the standard Normal distribution, using the SGM to convert the set of values into a set of latent variable values, and using the decoder network to convert the latent variable values into a generative output. The generative output may then be shown in display 724 during one or more game sessions on client device(s) 704.

In sum, the disclosed techniques improve generative output produced by VAEs, SGMs, and/or other types of generative models. An encoder neural network and a decoder neural network are pretrained with a standard Normal prior to convert between data points in a training dataset and latent variable values in a latent space. The pretrained encoder neural network, pretrained decoder neural network, and an SGM are trained end-to-end based on a reconstruction loss, a negative encoder entropy loss, and/or a cross-entropy loss. The cross-entropy loss can include one or more loss weightings that can be used to select between high data likelihood and perceptual quality of the generative output.

After training of the SGM, encoder neural network, and decoder neural network is complete, the SGM and decoder neural network are included in a generative model that produces generative output. During operation of the generative model, a set of values is sampled from a base distribution (e.g., a standard Normal distribution) associated with the SGM. The SGM is used to iteratively remove noise from the set of values, thereby converting the set of values into a set of latent variable values in the latent space associated with the encoder neural network and decoder neural network. The decoder neural network is then applied to the first set of latent variable values to produce a likelihood distribution, and the generative output is sampled from the likelihood distribution.

One technical advantage of the disclosed techniques relative to the prior art is that, with the disclosed techniques, a score-based generative model generates mappings between a distribution of latent variables in a latent space and a base distribution that is similar to the distribution of latent variables in the latent space. The mappings can then be advantageously leveraged when generating data samples. In particular, the mappings allow the score-based generative model to perform fewer neural network evaluations and incur substantially less resource overhead when converting samples from the base distribution into a set of latent variable values from which data samples can be generated, relative to prior art approaches where thousands of neural network evaluations are performed via score-based generative models when converting noise samples into data samples from complex data distributions. Another advantage of the disclosed techniques is that, because the latent space associated with the latent variable values is continuous, an SGM can be used in a generative model that learns to generate non-continuous data. These technical advantages provide one or more technological improvements over prior art approaches.

1. In some embodiments, a computer-implemented method for generating an image comprises sampling from a first distribution associated with a score-based generative model to generate a first set of values; performing one or more denoising operations via the score-based generative model to convert the first set of values into a first set of latent variable values associated with a latent space; and converting the first set of latent variable values into the image.

2. The computer-implemented method of clause 1, wherein converting the first set of latent variable values into the image comprises performing one or more additional operations via a decoder network to convert the first set of latent variable values into the image.

3. The computer-implemented method of any of clause 1-2, wherein the image comprises at least one face.

4. In some embodiments, a computer-implemented method for generating data comprises sampling from a first distribution associated with a score-based generative model to generate a first set of values; performing one or more denoising operations via the score-based generative model to convert the first set of values into a first set of latent variable values associated with a latent space; and converting the first set of latent variable values into a generative output.

5. The computer-implemented method of clause 4, wherein converting the first set of latent variable values into the generative output comprises performing one or more additional operations via a decoder neural network to convert the first set of latent variable values into the generative output.

6. The computer-implemented method of any of clauses 4-5, wherein converting the first set of latent variable values into the generative output comprises sampling the generative output from a likelihood distribution, wherein the likelihood distribution is generated from the first set of latent variable values.

7. The computer-implemented method of any of clauses 4-6, wherein performing the one or more denoising operations comprises generating a second distribution of latent variables based on the first set of values; and sampling the first set of latent variable values from the second distribution.

8. The computer-implemented method of any of clauses 4-7, wherein performing the one or more denoising operations comprises reversing a diffusion process that converts one or more data points into one or more noise samples associated with the first distribution.

9. The computer-implemented method of any of clauses 4-8, wherein performing the one or more denoising operations comprises solving an ordinary differential equation based on the first set of values and a set of score values generated by the score-based generative model.

10. The computer-implemented method of any of clauses 4-9, wherein the ordinary differential equation is associated with a stochastic differential equation that represents an operation of the score-based generative model.

11. The computer-implemented method of any of clauses 4-10, wherein performing the one or more denoising operations comprises iteratively updating a second distribution of latent variables based on the first set of values and a set of score values generated by the score-based generative model.

12. The computer-implemented method of any of clauses 4-11, wherein the score-based generative model comprises a set of residual network blocks.

13. The computer-implemented method of any of clauses 4-12, wherein the first distribution comprises a standard normal distribution.

14. In some embodiments, one or more non-transitory computer readable media store instructions that, when executed by one or more processors, cause the one or more processors to perform the steps of sampling from a first distribution associated with a score-based generative model to generate a first set of values; performing one or more denoising operations via the score-based generative model to convert the first set of values into a first set of latent variable values associated with a latent space; and converting the first set of latent variable values into a generative output.

15. The one or more non-transitory computer readable media of clause 14, wherein converting the first set of latent variable values into the generative output comprises applying a decoder neural network to the first set of latent variable values to produce a likelihood distribution; and sampling the generative output from the likelihood distribution.

16. The one or more non-transitory computer readable media of any of clauses 14-15, wherein the decoder neural network is included in a variational autoencoder that converts between a set of data points included in a training dataset and one or more distributions of the latent variable values.

17. The one or more non-transitory computer readable media of any of clauses 14-16, wherein performing the one or more denoising operations comprises reversing a diffusion process that converts one or more data points into one or more noise samples associated with the first distribution.

18. The one or more non-transitory computer readable media of any of clauses 14-17, wherein performing the one or more denoising operations comprises determining a second distribution associated with the first set of latent variable values based on an ordinary differential equation (ODE) and a set of score values generated by the score-based generative model based on the first set of values.

19. The one or more non-transitory computer readable media of any of clauses 14-18, wherein performing the one or more denoising operations comprises performing ancestral sampling associated with the first set of values and a set of score values generated by the score-based generative model.

20. The one or more non-transitory computer readable media of any of clauses 14-19, wherein the first distribution comprises a standard Normal distribution, and wherein the score-based generative model corrects for a mismatch between a second distribution of latent variables associated with the latent space and the first distribution.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating an image, the method comprising:
   sampling from a first distribution associated with a score-based generative model to generate a first set of values;
   performing one or more denoising operations via the score-based generative model to convert the first set of values into a first set of latent variable values associated with a latent space; and
   converting the first set of latent variable values into the image.

2. The computer-implemented method of claim 1, wherein converting the first set of latent variable values into the image comprises performing one or more additional operations via a decoder network to convert the first set of latent variable values into the image.

3. The computer-implemented method of claim 1, wherein the image comprises at least one face.

4. A computer-implemented method for generating data, the method comprising:
   sampling from a first distribution associated with a score-based generative model to generate a first set of values;
   performing one or more denoising operations via the score-based generative model to convert the first set of values into a first set of latent variable values associated with a latent space; and
   converting the first set of latent variable values into a generative output.

5. The computer-implemented method of claim 4, wherein converting the first set of latent variable values into the generative output comprises performing one or more additional operations via a decoder neural network to convert the first set of latent variable values into the generative output.

6. The computer-implemented method of claim 4, wherein converting the first set of latent variable values into the generative output comprises sampling the generative output from a likelihood distribution, wherein the likelihood distribution is generated from the first set of latent variable values.

7. The computer-implemented method of claim 4, wherein performing the one or more denoising operations comprises:
   generating a second distribution of latent variables based on the first set of values; and
   sampling the first set of latent variable values from the second distribution.

8. The computer-implemented method of claim 4, wherein performing the one or more denoising operations comprises reversing a diffusion process that converts one or more data points into one or more noise samples associated with the first distribution.

9. The computer-implemented method of claim 4, wherein performing the one or more denoising operations comprises solving an ordinary differential equation based on the first set of values and a set of score values generated by the score-based generative model.

10. The computer-implemented method of claim 9, wherein the ordinary differential equation is associated with a stochastic differential equation that represents an operation of the score-based generative model.

11. The computer-implemented method of claim 4, wherein performing the one or more denoising operations comprises iteratively updating a second distribution of latent variables based on the first set of values and a set of score values generated by the score-based generative model.

12. The computer-implemented method of claim 4, wherein the score-based generative model comprises a set of residual network blocks.

13. The computer-implemented method of claim 4, wherein the first distribution comprises a standard normal distribution.

14. One or more non-transitory computer readable media storing instructions that, when executed by one or more processors, cause the one or more processors to perform the steps of:
- sampling from a first distribution associated with a score-based generative model to generate a first set of values;
- performing one or more denoising operations via the score-based generative model to convert the first set of values into a first set of latent variable values associated with a latent space; and
- converting the first set of latent variable values into a generative output.

15. The one or more non-transitory computer readable media of claim 14, wherein converting the first set of latent variable values into the generative output comprises:
- applying a decoder neural network to the first set of latent variable values to produce a likelihood distribution; and
- sampling the generative output from the likelihood distribution.

16. The one or more non-transitory computer readable media of claim 15, wherein the decoder neural network is included in a variational autoencoder that converts between a set of data points included in a training dataset and one or more distributions of the latent variable values.

17. The one or more non-transitory computer readable media of claim 14, wherein performing the one or more denoising operations comprises reversing a diffusion process that converts one or more data points into one or more noise samples associated with the first distribution.

18. The one or more non-transitory computer readable media of claim 14, wherein performing the one or more denoising operations comprises determining a second distribution associated with the first set of latent variable values based on an ordinary differential equation (ODE) and a set of score values generated by the score-based generative model based on the first set of values.

19. The one or more non-transitory computer readable media of claim 14, wherein performing the one or more denoising operations comprises performing ancestral sampling associated with the first set of values and a set of score values generated by the score-based generative model.

20. The one or more non-transitory computer readable media of claim 14, wherein the first distribution comprises a standard Normal distribution, and wherein the score-based generative model corrects for a mismatch between a second distribution of latent variables associated with the latent space and the first distribution.

* * * * *